US012718795B2

(12) United States Patent
Geramifard et al.

(10) Patent No.: US 12,718,795 B2
(45) Date of Patent: Aug. 25, 2026

(54) DATA DRIVEN DIALOG MANAGEMENT

(71) Applicant: Amazon Technologies, Inc., Seattle, WA (US)

(72) Inventors: Alborz Geramifard, Cambridge, MA (US); Shiladitya Roy, Bellevue, WA (US); Ruhi Sarikaya, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/414,530

(22) Filed: Jan. 17, 2024

(65) Prior Publication Data

US 2024/0153489 A1 May 9, 2024

Related U.S. Application Data

(63) Continuation of application No. 17/106,395, filed on Nov. 30, 2020, now abandoned, which is a continuation of application No. 15/710,229, filed on Sep. 20, 2017, now Pat. No. 10,854,191.

(51) Int. Cl.
*G10L 15/22* (2006.01)
*G10L 15/01* (2013.01)
*G10L 15/16* (2006.01)

(52) U.S. Cl.
CPC .............. *G10L 15/01* (2013.01); *G10L 15/16* (2013.01); *G10L 15/22* (2013.01); *G10L 2015/225* (2013.01)

(58) Field of Classification Search
CPC ................................ G10L 15/22; G10L 15/18
See application file for complete search history.

(56) References Cited

U.S. PATENT DOCUMENTS 9,721,570 B1 * 8/2017 Beal ........................ G06F 3/167
2014/0311001 A1 * 10/2014 Mitchell .................. G09F 3/10 156/60
2015/0179170 A1 * 6/2015 Sarikaya ................ G10L 15/22 704/275
2015/0363393 A1 * 12/2015 Williams ................ G10L 15/22 704/8
2016/0171119 A1 * 6/2016 Bufe .................. G06F 16/9535 715/746
2017/0091171 A1 * 3/2017 Perez ...................... G06F 40/35
2017/0277993 A1 * 9/2017 Beaver ............... G06Q 30/0201
2018/0052664 A1 * 2/2018 Zhang ...................... G06N 5/04
2018/0068658 A1 * 3/2018 Lehman .................. G06F 40/35
2018/0322880 A1 * 11/2018 Vuskovic ........... G10L 15/1815

* cited by examiner

*Primary Examiner* — Jialong He
(74) *Attorney, Agent, or Firm* — Pierce Atwood LLP

(57) ABSTRACT

Techniques for selecting an application to perform an action based on a user satisfaction with a current exchange are described. A user speaks an utterance and the system generates dialog state data corresponding to various information associated with a current exchange between the user and the system, including input audio data, speech processing results, context data, personal graph data, etc. The system may estimate a user satisfaction value associated with the current exchange and update the dialog state data to include the estimated user satisfaction value. The system processes the updated dialog state to generate candidate actions corresponding to actions to be performed by an application in response to the utterance. The system may process to select a single action from the candidate actions and generate a request for the application to perform the action.

18 Claims, 16 Drawing Sheets

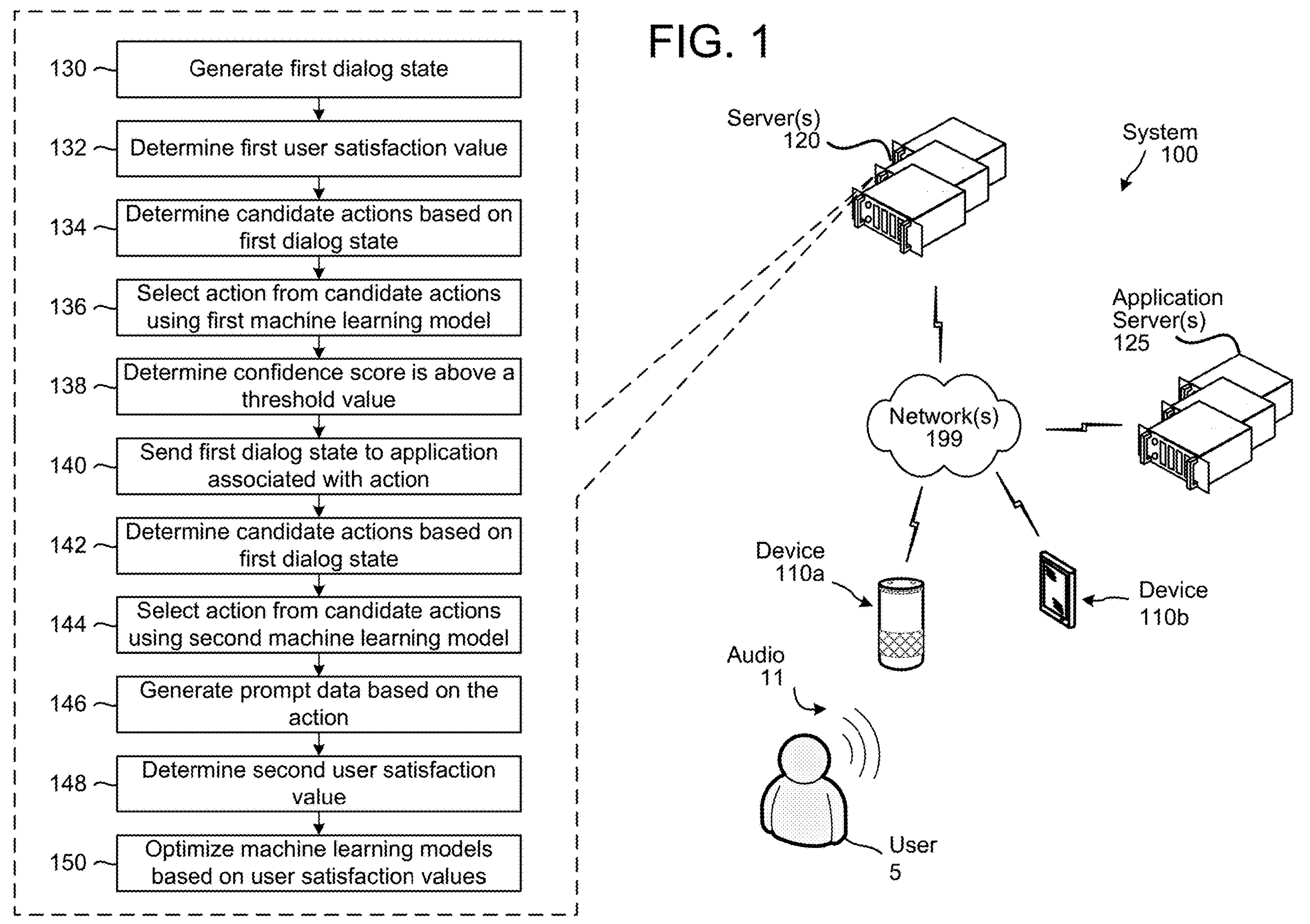
FIG. 1
130 Generate first dialog state
132 Determine first user satisfaction value
134 Determine candidate actions based on first dialog state
136 Select action from candidate actions using first machine learning model
138 Determine confidence score is above a threshold value
140 Send first dialog state to application associated with action
142 Determine candidate actions based on first dialog state
144 Select action from candidate actions using second machine learning model
146 Generate prompt data based on the action
148 Determine second user satisfaction value
150 Optimize machine learning models based on user satisfaction values
Server(s) 120
System 100
Application Server(s) 125
Network(s) 199
Device 110a
Device 110b
Audio 11
User 5

Server(s)
120
Audio
Data
211
Wakeword
Detection
Component
220
Device
110
Input
Audio
11
Speech Processing
240
Speech
Recognition
250
Natural Language
260
User Recognition
295
Orchestrator
230
User Profile
Storage
270
Application A
290a
Text-to-Speech
(TTS)
280

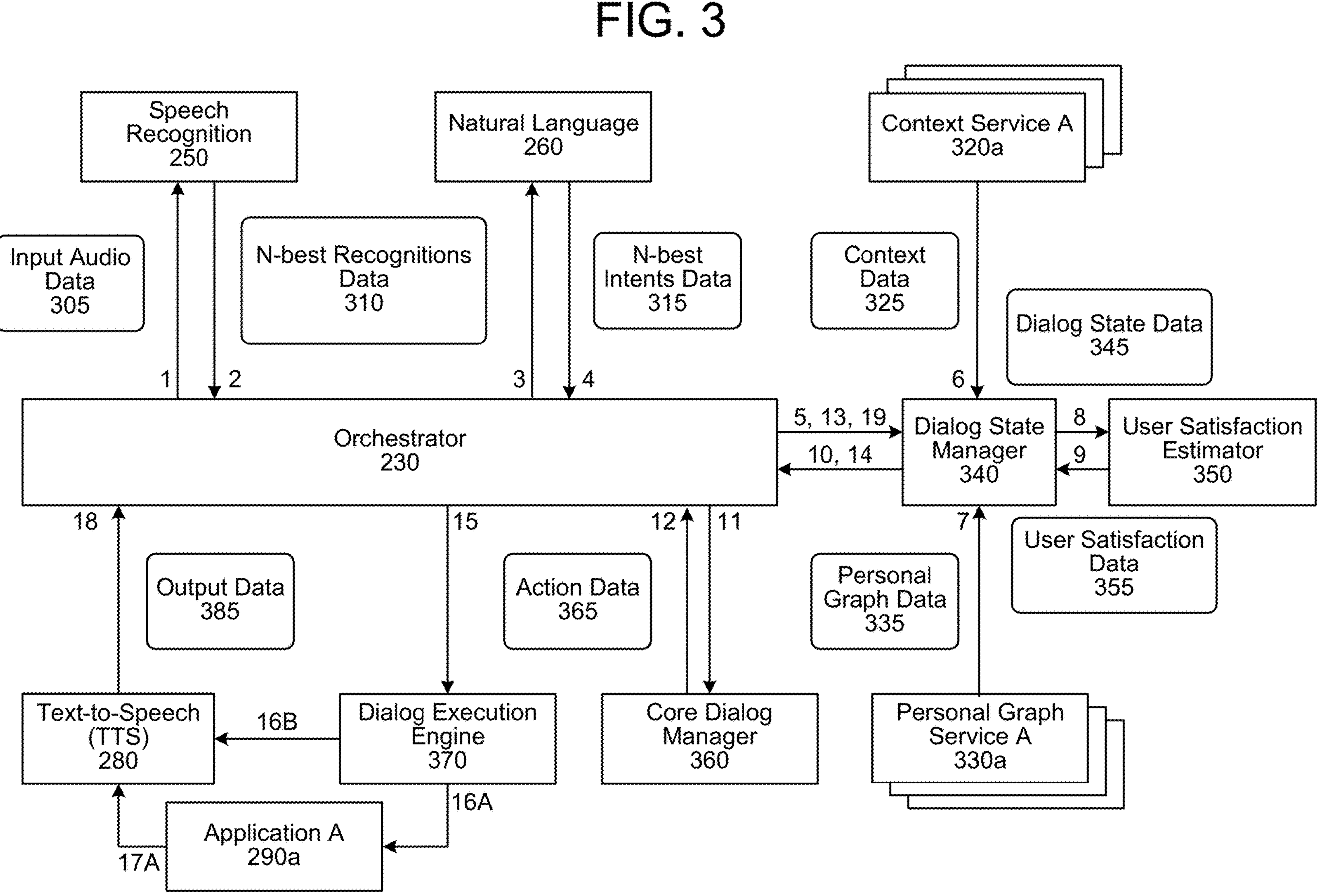
FIG. 3
Speech Recognition 250
Natural Language 260
Context Service A 320a
Input Audio Data 305
N-best Recognitions Data 310
N-best Intents Data 315
Context Data 325
Dialog State Data 345
1
2
3
4
6
Orchestrator 230
5, 13, 19
10, 14
Dialog State Manager 340
8
9
User Satisfaction Estimator 350
18
15
12
11
7
User Satisfaction Data 355
Output Data 385
Action Data 365
Personal Graph Data 335
Text-to-Speech (TTS) 280
16B
Dialog Execution Engine 370
Core Dialog Manager 360
Personal Graph Service A 330a
16A
Application A 290a
17A

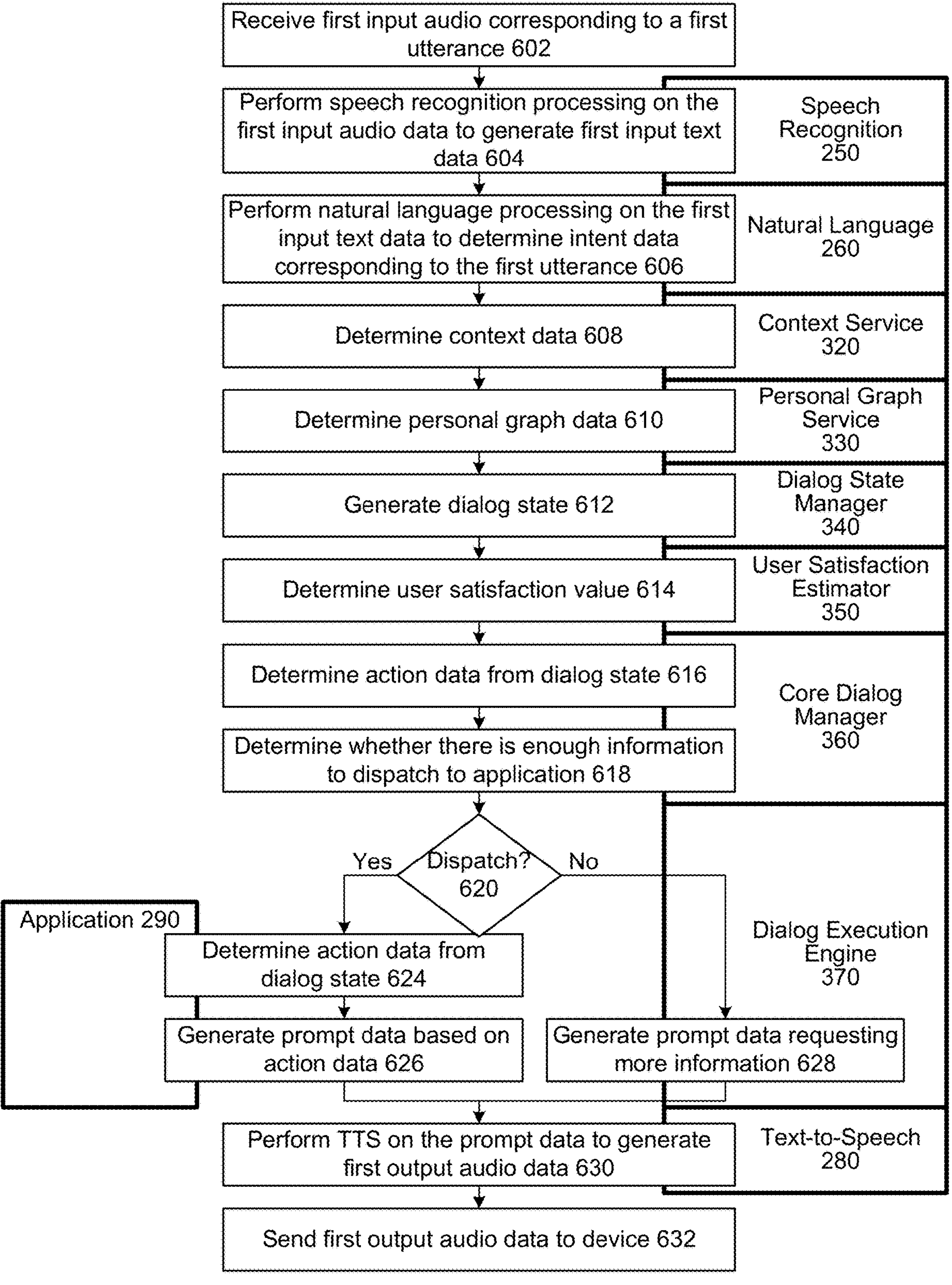
FIG. 6
Receive first input audio corresponding to a first utterance 602
Perform speech recognition processing on the first input audio data to generate first input text data 604
Speech Recognition 250
Perform natural language processing on the first input text data to determine intent data corresponding to the first utterance 606
Natural Language 260
Determine context data 608
Context Service 320
Determine personal graph data 610
Personal Graph Service 330
Generate dialog state 612
Dialog State Manager 340
Determine user satisfaction value 614
User Satisfaction Estimator 350
Determine action data from dialog state 616
Determine whether there is enough information to dispatch to application 618
Core Dialog Manager 360
Dispatch? 620
Yes
No
Application 290
Determine action data from dialog state 624
Generate prompt data based on action data 626
Generate prompt data requesting more information 628
Dialog Execution Engine 370
Perform TTS on the prompt data to generate first output audio data 630
Text-to-Speech 280
Send first output audio data to device 632

FIG. 7

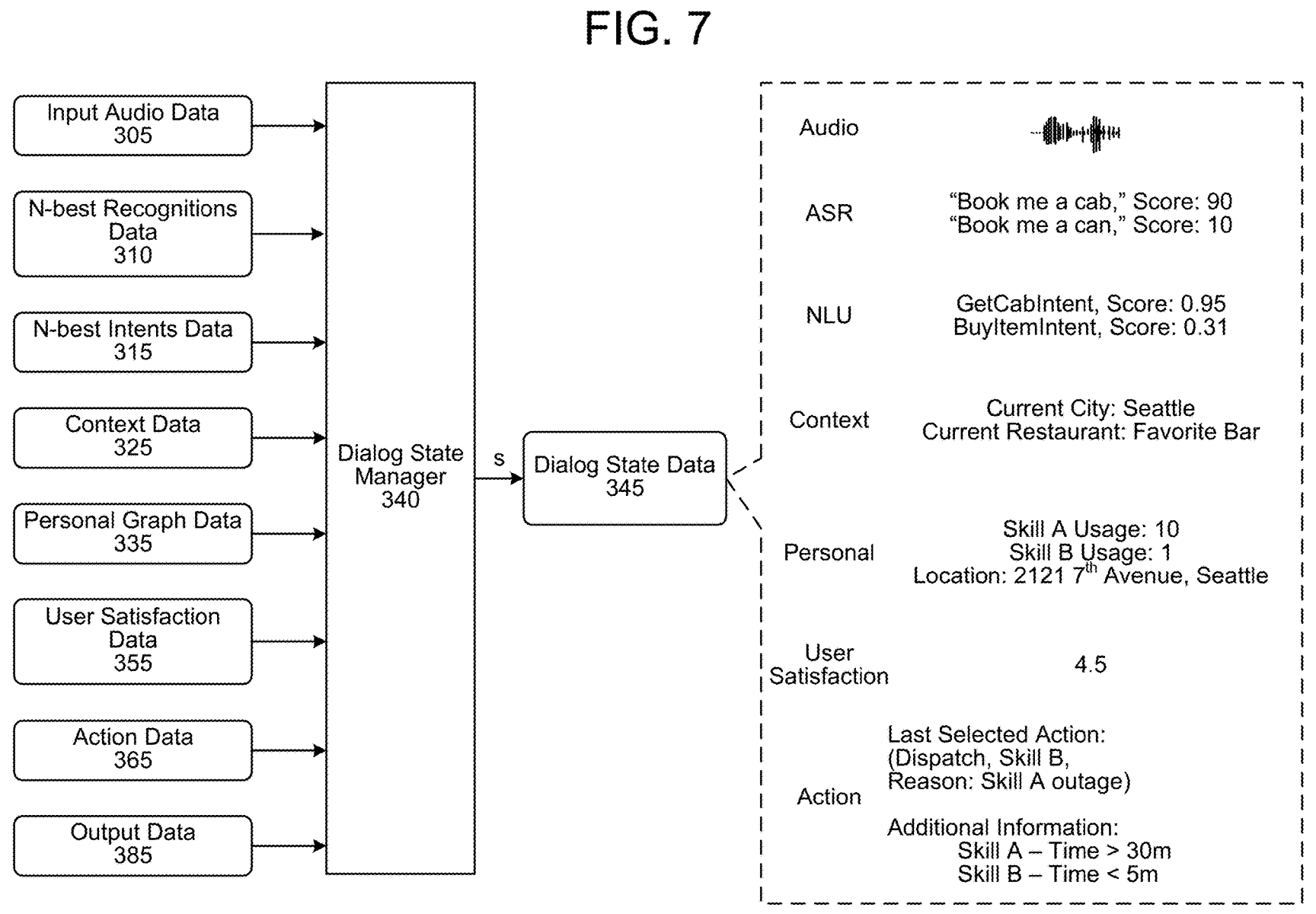

Input Audio Data 305

N-best Recognitions Data 310

N-best Intents Data 315

Context Data 325

Personal Graph Data 335

User Satisfaction Data 355

Action Data 365

Output Data 385

Dialog State Manager 340 s

Dialog State Data 345

Audio

ASR
“Book me a cab,” Score: 90
“Book me a can,” Score: 10

NLU
GetCabIntent, Score: 0.95
BuyItemIntent, Score: 0.31

Context
Current City: Seattle
Current Restaurant: Favorite Bar

Personal
Skill A Usage: 10
Skill B Usage: 1
Location: 2121 7th Avenue, Seattle

User Satisfaction
4.5

Action
Last Selected Action:
(Dispatch, Skill B,
Reason: Skill A outage)

Additional Information:
Skill A – Time > 30m
Skill B – Time < 5m

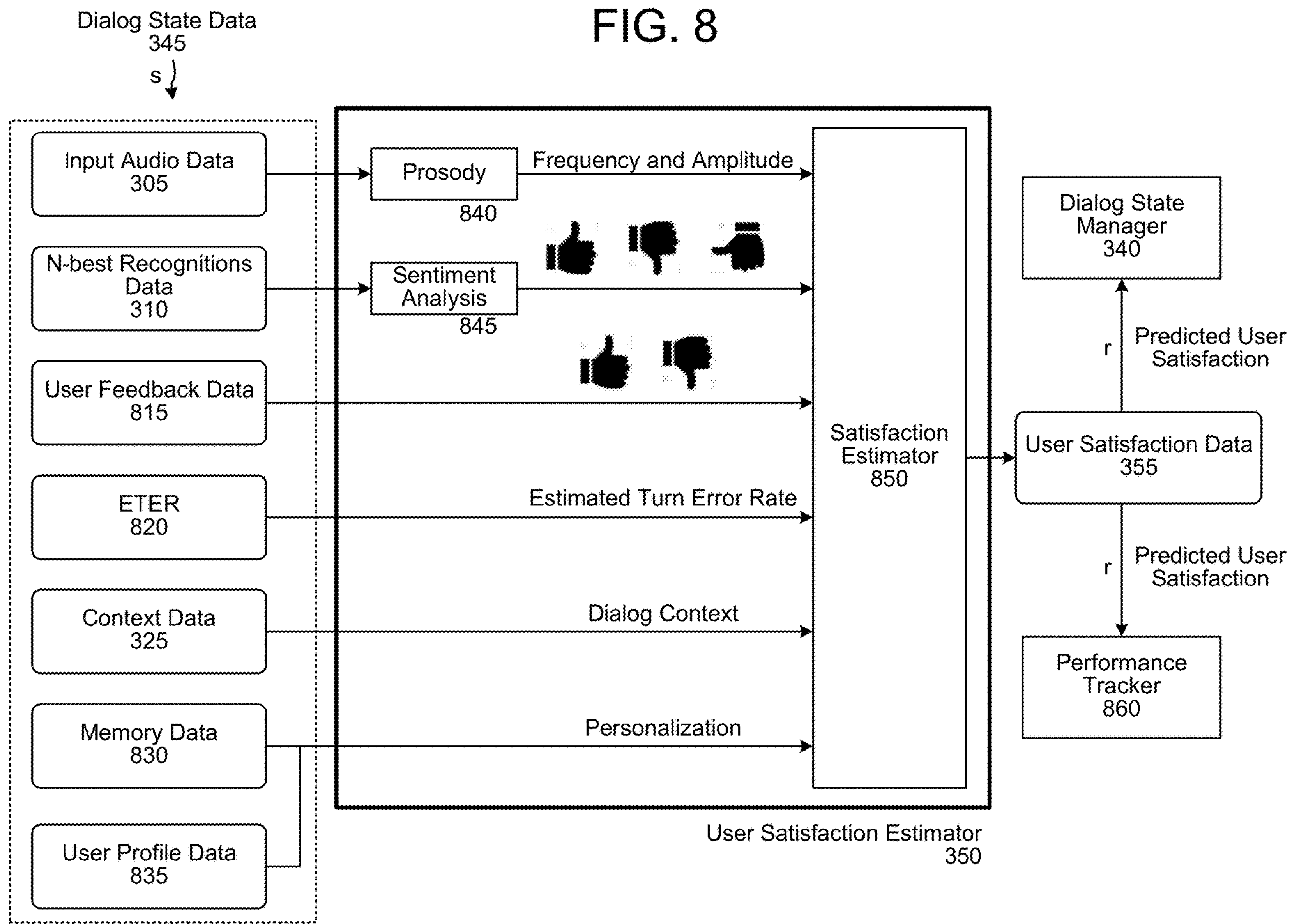
FIG. 8
Dialog State Data
345
s
Input Audio Data
305
N-best Recognitions Data
310
User Feedback Data
815
ETER
820
Context Data
325
Memory Data
830
User Profile Data
835
Prosody
840
Sentiment Analysis
845
Frequency and Amplitude
Estimated Turn Error Rate
Dialog Context
Personalization
Satisfaction Estimator
850
User Satisfaction Estimator
350
User Satisfaction Data
355
Predicted User Satisfaction
r
Dialog State Manager
340
Predicted User Satisfaction
r
Performance Tracker
860

Dialog State Data 345
s
Rule-Based Candidate Generator 920
DNN Candidate Generator 930
Dispatch/Disambiguate Actions
Dispatch Actions
Action Selector 950
Rule-Based Selector 952
DNN Selector 954
Core Dialog Manager 360
Action Data 365
Selected Action (Dispatch or Dialog)
A
B
Additional Information
Application A 290a

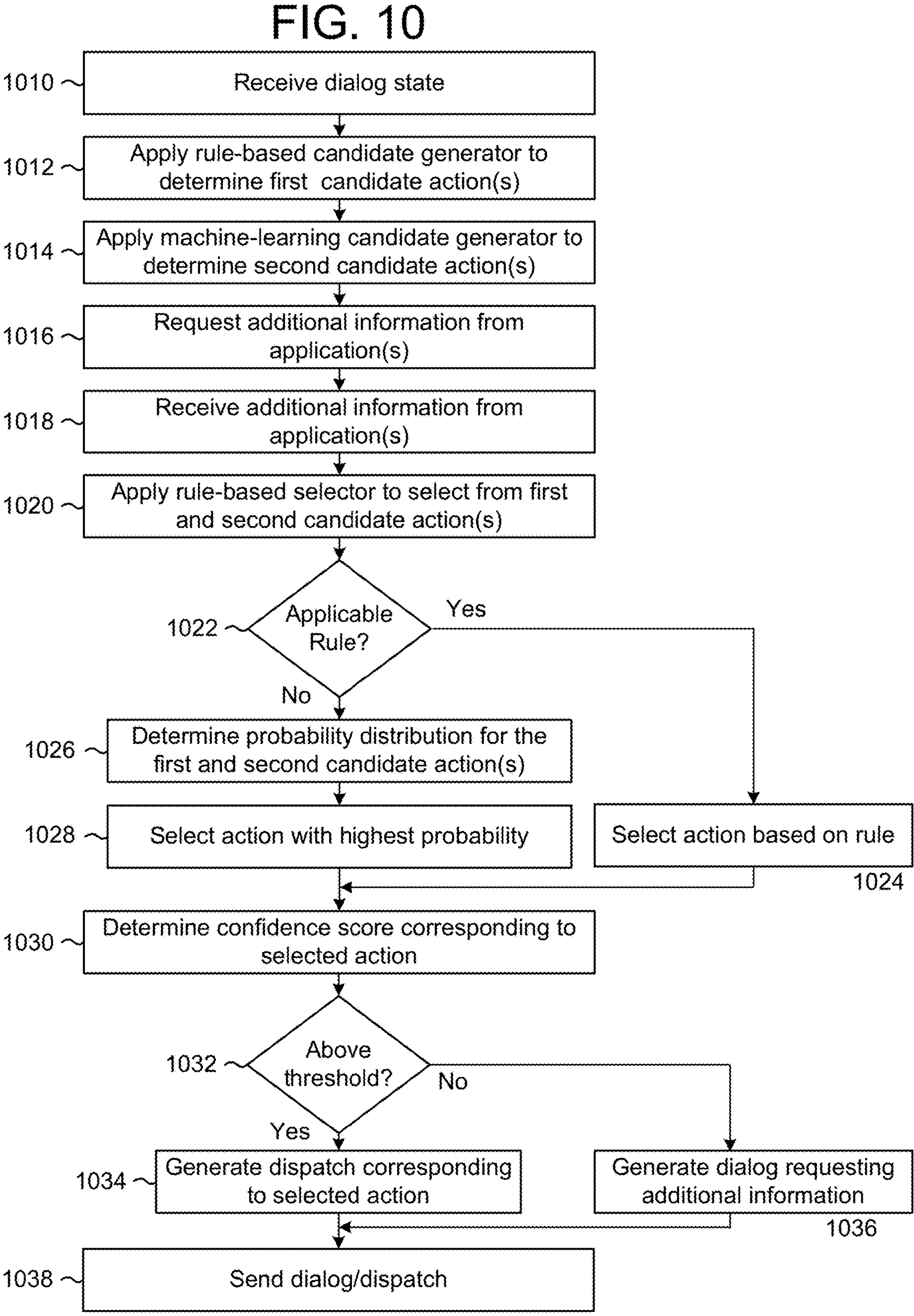
FIG. 10
1010
Receive dialog state
1012
Apply rule-based candidate generator to determine first candidate action(s)
1014
Apply machine-learning candidate generator to determine second candidate action(s)
1016
Request additional information from application(s)
1018
Receive additional information from application(s)
1020
Apply rule-based selector to select from first and second candidate action(s)
1022
Applicable Rule?
Yes
No
1026
Determine probability distribution for the first and second candidate action(s)
1028
Select action with highest probability
Select action based on rule
1024
1030
Determine confidence score corresponding to selected action
1032
Above threshold?
No
Yes
1034
Generate dispatch corresponding to selected action
Generate dialog requesting additional information
1036
1038
Send dialog/dispatch Dialog State Data 345
s
Dispatch Options
Rule-Based Action Generator 1120
Dialog Actions
Action Selector 1150
Rule-Based Selector 1152
DNN Selector 1154
Dialog Manager 1160
Selected Action
Action Data 1165
Dialog Execution Engine 1170
Prompt
Updated Dialog State
Application A 290a

FIG. 14

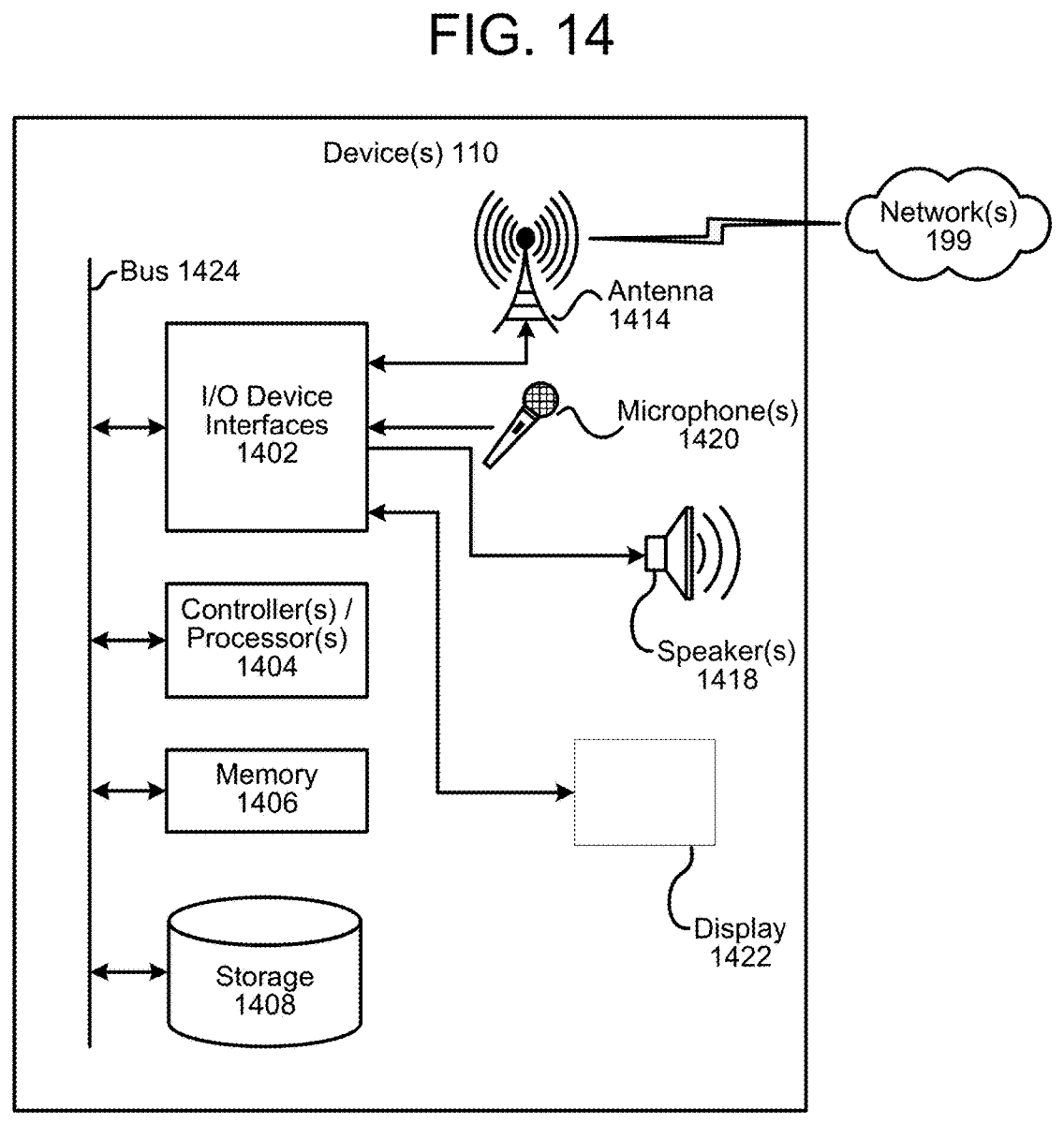

Network(s)
199

Device(s) 110

Antenna
1414

Microphone(s)
1420

Speaker(s)
1418

Display
1422

I/O Device
Interfaces
1402

Controller(s) /
Processor(s)
1404

Memory
1406

Storage
1408

Bus 1424

FIG. 15

Network(s)
199

Server(s) 120

Bus 1524

I/O Device
Interfaces
1502

Controller(s) /
Processor(s)
1504

Memory
1506

Storage
1508

Application Server(s) 125
Speech-Detection Device 110a
Display Device 110f
Vehicle 110e
Network(s) 199
Tablet Computer 110d
Server(s) 120
Smart Phone 110b
Camera(s) 110g
Smart Watch 110c
08:00

DATA DRIVEN DIALOG MANAGEMENT

CROSS REFERENCE TO RELATED APPLICATION

This application is a continuation of, and claims priority to, U.S. Non-provisional patent application Ser. No. 17/106,395, entitled "DATA DRIVEN DIALOG MANAGEMENT," filed on Nov. 30, 2020, which is a continuation of, and claims priority to, U.S. Non-provisional patent application Ser. No. 15/710,229, entitled "MACHINE LEARNING MODELS FOR DATA DRIVEN DIALOG MANAGEMENT," filed on Sep. 20, 2017, which issued as U.S. Pat. No. 10,854,191. The contents of the above applications are hereby expressly incorporated by reference in their entireties.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to optimize dialog management for user satisfaction using machine learning according to embodiments of the present disclosure.

FIG. 3 is a diagram of components of a server(s) according to embodiments of the present disclosure.

FIG. 6 is a flowchart illustrating an example method of processing speech to determine an action according to embodiments of the present disclosure.

FIG. 7 illustrates examples of inputs to and outputs from a dialog state manager according to embodiments of the present disclosure.

FIG. 8 illustrates examples of inputs to and outputs from a user satisfaction estimator according to embodiments of the present disclosure.

FIG. 10 is a flowchart illustrating an example method of determining an action and associated application according to embodiments of the present disclosure.

FIG. 14 is a block diagram conceptually illustrating example components of a device according to embodiments of the present disclosure.

FIG. 15 is a block diagram conceptually illustrating example components of a server according to embodiments of the present disclosure.

DETAILED DESCRIPTION

Figure 2:
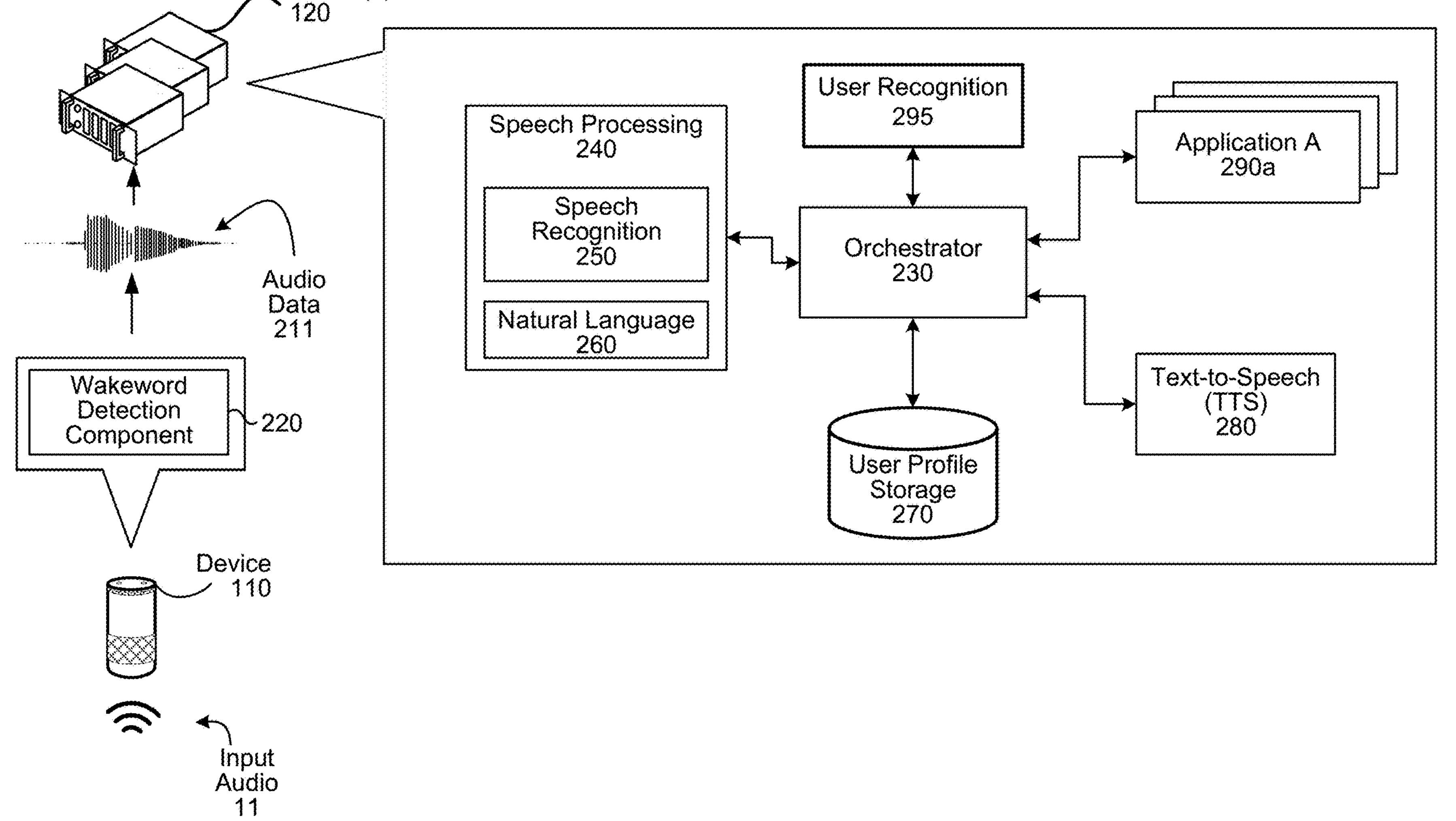
FIG. 2 is a diagram of components of a system according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. Likewise, text-to-speech (TTS) is a field of computer science, artificial intelligence, and linguistics concerned with enabling computers to output synthesized speech. ASR, NLU, and TTS are often used together as part of a speech processing system.

A computing system may be configured to execute a command in response to user input, which may be in the form of a spoken utterance. For example, a user may speak "play some music." In response, the system may output music. If the user wants the system to thereafter execute another command, the user may provide a second input. For example, while the system is outputting the music, the user may speak "increase the volume." In response, the system may raise the volume at which the music is output. Thus, present systems are configured to operate with respect to a specific user input.

As part of executing a command, the system may determine whether additional information is needed to select an appropriate command that corresponds to the user request. For example, if the user speaks "play some music," but does not specify what music application to use, the system may generate a first candidate command to play music using a first application and may generate a second candidate command to play music using a second application. If the system doesn't have enough information to decide between the two applications and/or a highest confidence score associated with a candidate command is below a threshold, the system may choose whether to request additional information from the user or to select the candidate command having the highest confidence score. Systems implementing aspects of the present disclosure may be configured to make this decision based on optimizing user satisfaction with the decision. For example, requesting additional information may decrease user satisfaction, so the system may select the most likely command without requesting additional information.

The present disclosure improves upon present systems by optimizing an overall user satisfaction. Instead of only comparing the user satisfaction before and after making the decision (e.g., determining that requesting additional information decreases user satisfaction relative to not requesting additional information and therefore not requesting additional information), the improved system may compare an expected sum of user satisfaction values and make a decision that optimizes the expected sum of user satisfaction values over time. For example, the improved system may determine that requesting additional information decreases user satisfaction a small amount, but not requesting the additional information may result in executing an incorrect command that would decrease user satisfaction a large amount. Thus, the improved system may request the additional information in order to prevent executing the incorrect command.

To enable the improved system to optimize the user satisfaction, the improved system may estimate a user satisfaction value and associate the estimated user satisfaction value with a current dialog state. By tracking user satisfaction values and corresponding dialog states over time, the improved system may be configured to train machine learning models to optimize the expected sum of user satisfaction values. For example, a machine learning model associated with the improved system may be optimized to receive a dialog state and select an action and/or application that maximizes an overall user satisfaction. Similarly, a machine learning model associated with a specific application may be optimized to receive the dialog state and select an action and/or intent associated with the application that maximizes the overall user satisfaction. This enables functionality of the improved system and/or specific applications to be improved without specific programming or analysis being performed by a content owner associated with the application. Instead, the content owner may request that the improved system optimize the functionality of the application and the machine learning model may be trained to optimize an expected sum of user satisfaction values without direct involvement of the content owner.

FIG. 1 illustrates a system configured to optimize dialog management for user satisfaction using machine learning according to embodiments of the present disclosure. Although the figures and discussion illustrate certain operational steps of the system in a particular order, the steps described may be performed in a different order (as well as certain steps removed or added) without departing from the intent of the disclosure. As shown in FIG. 1, the system may include one or more devices (110*a*/110*b*) local to a user 5, one or more servers 120, and one or more application servers 125 connected across one or more networks 199. The server(s) 120 (which may be one or more different physical devices) may be capable of performing speech processing (e.g., ASR and NLU) as well as non-speech processing operations as described herein. A single server 120 may perform all speech processing or multiple servers 120 may combine to perform all speech processing.

As shown in FIG. 1, a device 110*a* may receive audio 11 including a spoken utterance of a user 5 via a microphone (or array of microphones) of the device 110*a*. The device 110*a* generates input audio data corresponding to the audio 11, and sends the input audio data to the server(s) 120 for processing. Alternatively, a device 110*b* may receive text input by the user 5 via either a physical keyboard or virtual keyboard presented on a touch sensitive display of the device 110*b*. The device 110*b* generates input text data corresponding to the text, and sends the input text data to the server(s) 120 for processing.

The server(s) 120 receives input data from a device (110*a*/110*b*). If the input data is the input audio data from the device 110*a*, the server(s) 120 performs speech recognition processing (e.g., ASR) on the input audio data to generate input text data. The server(s) 120 performs natural language processing (e.g., NLU) on input text data (either received from the device 110*b* or generated from the input audio data received from the device 110*a*) to determine a user command A user command may correspond to a user request for the system to output content to the user. The requested content to be output may correspond to music, video, search results, weather information, etc.

The server(s) 120 determines output content responsive to the user command. The output content may be received from a first party (1P) source (e.g., one controlled or managed by the server(s) 120) or a third party (3P) source (e.g., one managed by an application server(s) 125 in communication with the server(s) 120 but not controlled or managed by the server(s) 120). The server(s) 120 sends to a device (110*a*/110*b*) output data including the output content responsive to the user command. The device (110/110*b*) may emit the output data as audio and/or present the output data on a display.

The server(s) 120 may determine output content responsive to the user command by performing an action. For example, in response to the user command, the server(s) 120 may determine one or more actions that correspond to the user command and may select one of the actions to perform. Examples of actions include launching an application (e.g., sending dialog data or other data to a specific application to be processed, which may correspond to a dispatch request), performing disambiguation (e.g., determining that the server(s) 120 doesn't have enough information to execute a command and generating a dialog request that requests additional information from the user), confirming the action with a user (e.g., generating audio data and/or display data indicating the action to be performed and requesting confirmation from the user), displaying information to the user (e.g., generating display data in response to the user command, such as displaying a second page of content), playing audio information for the user (e.g., generating audio data in response to the user command, such as indicating that the application is being launched, that a volume has been changed, and/or the like), or the like.

The device 110*a* may, thereafter, receive second audio including a spoken utterance of a user 5 via a microphone (or array of microphones) of the device 110*a*. The device 110*a* generates second input audio data corresponding to the second audio 11, and sends the second input audio data to the server(s) 120 for processing. Alternatively, the device 110*b* may receive second text input by the user 5. The device 110*b* generates second input text data corresponding to the second text, and sends the second input text data to the server(s) 120 for processing.

The system may operate using various components as illustrated in and described with respect to FIG. 2. The various components illustrated in FIG. 2 may be located on a same or different physical device. Communication between various components illustrated in FIG. 2 may occur directly or across a network(s) 199.

An audio capture component, such as a microphone or array of microphones of a device 110, captures the input audio 11 corresponding to a spoken utterance. The device 110, using a wakeword detection component 220, processes audio data corresponding to the input audio 11 to determine if a keyword (e.g., a wakeword) is detected in the audio data. Following detection of a wakeword, the device 110 sends audio data 211, corresponding to the utterance, to a server(s) 120 for processing.

Upon receipt by the server(s) 120, the audio data 211 may be sent to an orchestrator component 230. The orchestrator component 230 may include memory and logic that enable the orchestrator component 230 to transmit various pieces and forms of data to various components of the system.

The orchestrator component 230 sends the audio data 211 to a speech processing component 240. A speech recognition component 250 of the speech processing component 240 transcribes the audio data 111 into text data representing words of speech contained in the audio data 111. The speech recognition component 250 interprets the spoken utterance based on a similarity between the spoken utterance and pre-established language models. For example, the speech recognition component 250 may compare the audio data 111 with models for sounds (e.g., subword units or phonemes) and sequences of sounds to identify words that match the sequence of sounds spoken in the utterance of the audio data 111.

Results of speech recognition processing (i.e., text data representing speech) are processed by a natural language component 260 of the speech processing component 240. The natural language component 260 attempts to make a semantic interpretation of the text data. That is, the natural language component 260 determines the meaning behind the text data based on the individual words in the text data and then implements that meaning. The natural language component 260 interprets a text string to derive an intent or a desired action from the user as well as the pertinent pieces of information in the text data that allow a device (e.g., the device 110, the server(s) 120, the application server(s) 125, etc.) to complete that action. For example, if a spoken utterance is processed using the speech recognition component 250, which outputs the text data "call mom", the natural language component 260 may determine the user intended to activate a telephone in his/her device and to initiate a call with a contact matching the entity "mom."

The natural language component 260 may be configured to determine a "domain" of the utterance so as to determine and narrow down which services offered by an endpoint device (e.g., the server(s) 120 or the device 110) may be relevant. For example, an endpoint device may offer services relating to interactions with a telephone service, a contact list service, a calendar/scheduling service, a music player service, etc. Words in a single textual interpretation may implicate more than one service, and some services may be functionally linked (e.g., both a telephone service and a calendar service may utilize data from a contact list).

The natural language component 260 may include a recognizer that includes a named entity resolution (NER) component configured to parse and tag to annotate text as part of natural language processing. For example, for the text "call mom," "call" may be tagged as a command to execute a phone call and "mom" may be tagged as a specific entity and target of the command. Moreover, the telephone number for the entity corresponding to "mom" stored in a contact list may be included in the NLU results. Further, the natural language component 260 may be used to provide answer data in response to queries, for example using a natural language knowledge base.

In natural language processing, a domain may represent a discrete set of activities having a common theme, such as "shopping," "music," "calendaring," "communications," etc. As such, each domain may be associated with a particular recognizer, language model and/or grammar database, a particular set of intents/actions, and a particular personalized lexicon. Each gazetteer may include domain-indexed lexical information associated with a particular user and/or device. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as a vector with many bit values, where each bit indicates whether a data point associated with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional natural language processing, text data may be processed applying the rules, models, and information applicable to each identified domain. For example, if text represented in text data potentially implicates both communications and music, the text data may, substantially in parallel, be natural language processed using the grammar models and lexical information for communications, and natural language processed using the grammar models and lexical information for music. The responses based on the text data produced by each set of models is scored, with the overall highest ranked result from all applied domains being ordinarily selected to be the correct result.

A downstream process called named entity resolution actually links a text portion to an actual specific entity known to the system. To perform named entity resolution, the system may utilize gazetteer information stored in an entity library storage. The gazetteer information may be used for entity resolution, for example matching speech recognition results with different entities (e.g., song titles, contact names, etc.). Gazetteers may be linked to users (e.g., a particular gazetteer may be associated with a specific user's music collection), may be linked to certain domains (e.g., shopping, music, communications), or may be organized in a variety of other ways. The NER component may also determine whether a word refers to an entity that is not explicitly mentioned in the text data, for example "him," "her," "it" or other anaphora, exophora or the like.

A recognizer of the natural language component 260 may also include an intent classification (IC) component that processes text data to determine an intent(s), where the intent(s) corresponds to the action to be performed that is responsive to the user command represented in the text data. Each recognizer is associated with a database of words linked to intents. For example, a music intent database may link words and phrases such as "quiet," "volume off," and "mute" to a "mute" intent. The IC component identifies potential intents by comparing words in the text data to the words and phrases in the intents database. Traditionally, the IC component determines using a set of rules or templates that are processed against the incoming text data to identify a matching intent.

In order to generate a particular interpreted response, the NER component applies the grammar models and lexical information associated with the respective recognizer to recognize a mention of one or more entities in the text represented in the text data. In this manner the NER component identifies "slots" (i.e., particular words in text data) that may be needed for later command processing. Depending on the complexity of the NER component, it may also label each slot with a type (e.g., noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC component are linked to domain-specific grammar frameworks with "slots" or "fields" to be filled. Each slot/field corresponds to a portion of the text data that the system believes corresponds to an entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component may parse the text data to identify words as subject, object, verb, preposition, etc., based on grammar rules and/or models, prior to recognizing named entities. The identified verb may be used by the IC component to identify intent, which is then used by the NER component to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component then searches the corresponding fields in the domain-specific and personalized lexicon(s), attempting to match words and phrases in the text data tagged as a grammatical object or object modifier with those identified in the database(s). As used herein, "intent data" may correspond to the intent itself, framework(s) for the intent, slot(s)/field(s) corresponding to the intent, object modifier(s), any information associated with the intent/framework(s)/slot(s), or any combination thereof without departing from the disclosure.

To illustrate an example, a command of "book me a plane ticket from Boston to Seattle for July 5" may be associated with a <BookPlaneTicket> intent. The <BookPlaneTicket> intent may be associated with a framework including various slots including, for example, <DepartureDate>, <DepartureLocation>, <ArrivalDate>, and <DestinationLocation>. In the above example, the server(s) 120, namely the natural language component 260, may populate the framework as follows: <DepartureDate: July 5>, <DepartureLocation: Boston>, <ArrivalDate: July 5>, and <DestinationLocation: Seattle>.

This process includes semantic tagging, which is the labeling of a word or combination of words according to their type/semantic meaning. Parsing may be performed using heuristic grammar rules, or the NER component may be constructed using techniques such as HMMs, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component may search a database of generic words associated with the domain. For example, if the text data corresponds to "play songs by the rolling stones," after failing to determine an album name or song name called "songs" by "the rolling stones," the NER component may search the domain vocabulary for the word "songs." In the alternative, generic words may be checked before the gazetteer information, or both may be tried, potentially producing two different results.

The results of natural language processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The results of natural language processing may be sent to an application 290, which may be located on a same or separate server 120 as part of system. The system may include more than one application 290, and the destination application 290 may be determined based on the natural language processing results. For example, if the natural language processing results include a command to play music, the destination application 290 may be a music playing application, such as one located on the device 110 or in a music playing appliance, configured to execute a music playing command. If the natural language processing results include a search request (e.g., requesting the return of search results), the application 290 selected may include a search engine application, such as one located on a search server, configured to execute a search command and determine search results, which may include output text data to be processed by a text-to-speech engine and output from a device as synthesized speech.

The server(s) 120 may include a user recognition component 295. The user recognition component 295 may take as input the audio data 211 as well as the text data output by the speech recognition component 250. The user recognition component 295 may receive the text data from the speech recognition component 250 either directly or indirectly via the orchestrator component 230. Alternatively, the user recognition component 295 may be implemented as part of the speech recognition component 250. The user recognition component 295 determines respective scores indicating whether the utterance in the audio data 211 was spoken by particular users. The user recognition component 295 also determines an overall confidence regarding the accuracy of user recognition operations. User recognition may involve comparing speech characteristics in the audio data 211 to stored speech characteristics of users. User recognition may also involve comparing biometric data (e.g., fingerprint data, iris data, etc.) received by the user recognition component 295 to stored biometric data of users. User recognition may further involve comparing image data including a representation of at least a feature of a user with stored image data including representations of features of users. It should be appreciated that other kinds of user recognition processes, including those known in the art, may be used. Output of the user recognition component 295 may be used to inform natural language processing as well as processing performed by 1P and 3P applications 290.

The server(s) 120 may additionally include a user profile storage 270. The user profile storage 270 includes data regarding user accounts. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. The user profile storage 270 may include a variety of information related to individual users, accounts, etc. that interact with the system.

FIG. 2 illustrates various 1P applications 290 of the system. However, it should be appreciated that the data sent to the 1P applications 290 may also be sent to 3P application servers 125 executing 3P applications.

Application, as used herein, may be considered synonymous with a skill. A "skill" may correspond to a domain and may be software running on a server(s) 120 and akin to an application. That is, a skill may enable a server(s) 120 or application server(s) 125 to execute specific functionality in order to provide data or produce some other output called for by a user. The system may be configured with more than one skill. For example a weather service skill may enable the server(s) 120 to execute a command with respect to a weather service server(s) 125, a car service skill may enable the server(s) 120 to execute a command with respect to a taxi service server(s) 125, an order pizza skill may enable the server(s) 120 to execute a command with respect to a restaurant server(s) 125, etc.

While the examples illustrated above describe discrete skills associated with a specific service, the disclosure is not limited thereto and an application (e.g., skill) may be associated with specific and/or general functions, including system functions associated with the server(s) 120. For example, the speech processing component 240, the speech recognition component 250, the natural language component 260, or the like may correspond to an application running on the server(s) 120 (e.g., the server(s) 120 sends input data to the application and the application generates output data). Thus, an application or a skill may refer to a system process running on the server(s) 120, a first party application running on the server(s) 120, a third party application running on the server(s) 120 and/or the application server(s) 125, and/or the like without departing from the disclosure.

Output of the application/skill 290 may be in the form of text data to be conveyed to a user. As such, the application/skill output text data may be sent to a text-to-speech (TTS) component 280 either directly or indirectly via the orchestrator component 230. The TTS component 280 may synthesize speech corresponding to the received text data. Speech audio data synthesized by the TTS component 280 may be sent to a device 110 for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The server(s) 120 may further operate using various components as illustrated in and described with respect to FIG. 3. The speech recognition component 250 receives [1] input audio data 305 from the orchestrator component 230. The speech recognition component 250 processes the input audio data 305 to generate an N-best list of text possibly representing an utterance in the input audio data 305. The speech recognition component 250 outputs [2] N-best recognitions data 310, including text representing the generated N-best recognitions, to the orchestrator component 230.

The natural language component 260 receives [3] the N-best recognitions data 310 from the orchestrator component 230. The natural language component 260 processes the N-best recognitions data 310 with respect to domains of the server(s) 120. Each domain may be associated with a separate recognizer implemented within the natural language component 260. A recognizer may include an NER component and an IC component as described above. The natural language component 260 outputs [4] N-best intents data 315, representing an N-best list of the top scoring intents associated with the user command (as received by the server(s) 120 as either a spoken utterance or textual input), to the orchestrator component 230. The orchestrator component 230 may send [5] the input audio data 305, the N-best recognitions data 310, the N-best intents data 315, additional data, and/or any combination thereof to the dialog state manager 340.

The server(s) 120 may further include one or more context services 320. A context service 320 may be configured to output non-user specific context data, such as temporal information (e.g., time of day). A context service 320 may also be configured to output metadata associated with the device from which the user command was received. Examples of device metadata may include the type of device (e.g., car, phone, speaker, etc.) A context service 320 may further be configured to output data indicating previously received user commands and their determined intents. While FIG. 3 illustrates the context services 320 as a separate component, the disclosure is not limited thereto and one or more context services 320 may be included in the natural language component 260 without departing from the disclosure. The context services 320 may generate context data 325, which may include information about the dialog context and/or other information. Thus, FIG. 3 illustrates the context services 320 sending [6] the context data 325 to the dialog state manager 340. However, the disclosure is not limited thereto and the context services 320 may send the context data 325 to the dialog state manager 340, the natural language component 260 and/or the orchestrator 230 without departing from the disclosure.

In some examples, the context services 320 may include additional information relevant to applications and/or intents. For example, the context services 320 may include information about application ratings (e.g., 5 star rating for a first application and a 4 star rating for a second application), enabling the server(s) 120 to differentiate between similar applications based on ratings. Additionally or alternatively, the context services 320 may have location information associated with applications, enabling the server(s) 120 to select the first application in a first location and the second application in a second location. For example, the first application (e.g., Skill A corresponding to a first transportation company) may not have availability in certain cities, while the second application (e.g., Skill B, corresponding to a second transportation company) has availability, so the server(s) 120 may select the second application when the user requests a cab in locations that the first application lacks coverage. Similarly, the context services 320 may include information about context of a user request, enabling the server(s) 120 to select a first application based on a first user request but select a second application based on a second user request. For example, a first user request (e.g., "What is the weather?") may result in the server(s) 120 choosing a first application (e.g., Weather skill), whereas a second user request (e.g., "What is the wind?") may result in the server(s) 120 choosing a second application (e.g., PredictWind skill), despite the similarity in the user requests.

The server(s) 120 may additionally include one or more personal graph services 330. A personal graph service 330 may track user interactions with the system 100 and store previous interactions, user preferences and/or other user-specific information used to build a user profile. Thus, the personal graph services 330 may generate personal graph data 335 and may send [7] the personal graph data 335 to the dialog state manager 340 to include in the dialog state. In some examples, the personal graph data 335 includes information specific to the current dialog state. For example, if the user request indicates that the user would like to request a ride, the personal graph data 335 may indicate a first number of times that the user has used a first application (e.g., Skill A) and a second number of times that the user has used a second application (e.g., Skill B). This information is specific to the user but also relevant to the current dialog state. However, the disclosure is not limited thereto and the personal graph data 335 may include additional information without departing from the disclosure.

While the abovementioned examples illustrate the personal graph service 330 being tailored to a specific user, the disclosure is not limited thereto. In some examples, the personal graph service 330 may provide information according to different hierarchies. As discussed above, the personal graph service 330 may provide profile data on a user level (e.g., based on a system interaction history specific to a user ID associated with a user from which the current command originated). In addition, the personal graph service 330 may alternatively provide profile data on a device level (e.g., based on a system interaction history specific to a device ID associated with the device from which data corresponding to the current command was received). Additionally or alternatively, the personal graph service 330 may provide profile data on a user and device level (e.g., based on a system interaction history specific to a user ID as well as a device ID).

The dialog state manager 340 may receive [5] various inputs from the orchestrator 230, such as the input audio data 305, the N-best recognitions data 310, and/or the N-best intents data 315. In addition, the dialog state manager 340 may receive [6] the context data 325 from the context service 320 and may receive [7] the personal graph data 335 from the personal graph service 330. The dialog state manager 340 may generate dialog state data 345, including all of the data received that is associated with a current exchange with the user, as discussed in greater detail below with regard to FIG. 7. The dialog state manager 340 may send [8] the dialog state to the user satisfaction estimator 350.

The user satisfaction estimator 350 may receive [8] the dialog state data 345 and may generate user satisfaction data 355, which is a scalar value (e.g., between 1 and 5) that corresponds to an estimate of user satisfaction at a particular point in time. The user satisfaction estimator 350 may send [9] the user satisfaction data 355 to the dialog state manager 340 and the dialog state manager 340 may update the dialog state data 345 to include the user satisfaction data 355.

The system 100 may track the user satisfaction data 355 over a period of time. By associating the user satisfaction data 355 with a particular dialog state, the system 100 may determine changes in the user satisfaction values based on executing a particular action or command. For example, the system 100 may associate a first user satisfaction value with a first state, select an action and/or execute a command and associate a second user satisfaction value with a second state. By comparing the first user satisfaction value to the second user satisfaction value, the system 100 may determine whether the selected action and/or command increased or decreased user satisfaction and by how much. Thus, when tracking user satisfaction values over a long period of time, the system 100 may optimize machine learning models (e.g., trained models) to select actions and/or commands that maximize user satisfaction values. Further, instead of comparing user satisfaction values for each discrete decision to maximize user satisfaction at a specific point in time, the system 100 may compare an expected sum of user satisfaction values to maximize user satisfaction overall. The machine learning models will be discussed in greater detail below with regard to FIGS. 9-12, and training the machine learning models to maximize an expected sum of user satisfaction values will be discussed in greater detail below with regard to FIG. 13.

After generating and updating the dialog state with the user satisfaction value, the dialog state manager 340 may send the updated dialog state (e.g., dialog state data 345) to the orchestrator 230 and/or the core dialog manager 360. Additionally or alternatively, the orchestrator 230 may send the updated dialog state to the core dialog manager 360. The core dialog manager 360 may use rule-based candidate generators and/or machine learning candidate generators (e.g., Deep Neural Network (DNN) generators) to generate candidate actions based on the dialog state data 345 and may use rule-based selectors and/or machine learning selectors (e.g., DNN selectors) to select a single action from the candidate actions. The core dialog manager 360 may generate action data 365 that indicates the selected action, which may correspond to a dialog request or a dispatch request, and may send the action data 365 to the orchestrator 230 and/or the dialog state manager 340 (e.g., via the orchestrator 230).

The dialog state manager 340 may receive the action data 365 and may update the dialog state data 345 again to include the action data 365. The dialog state manager 340 may send [14] the updated dialog state data 345 to the orchestrator 230, which may send the updated dialog state data 345 to a dialog execution engine 370. The dialog execution engine 370 may receive [15] the updated dialog state data 345, including the action data 365, and may determine whether the action data 365 indicates that the dialog execution engine 370 should dispatch the action to an application (e.g., dispatch request) or to generate a prompt requesting additional information from the user (e.g., dialog request). For example, if the action data 365 includes a dispatch request, the dialog execution engine 370 may send [16A] the action data 365 and/or the dialog state data 345 to the application 290 specified by the action data 365. The application 290 (e.g., Application A 290*a*) may use rule-based action generators to generate candidate actions based on the dialog state data 345 and may use rule-based selectors and/or machine learning selectors (e.g., DNN selectors) to select a single action from the candidate actions. The application 290 may generate a prompt corresponding to the selected action and may generate an updated dialog state, which may be sent [17A] to the TTS component 280.

In contrast, if the action data 365 includes a dialog request, the dialog execution engine 370 may generate a prompt soliciting additional information from the user and may send [16B] the prompt and/or the dialog state data 345 to the TTS component 280. The solicitation may take the form of text output via a display of a user device or audio output by a speaker of a user device. Accordingly, if the solicitation to the user is to be audio, the TTS component 280 may generate output data 385 that includes output audio data based on the text data of the prompt. If the solicitation to the user does not include audio, the TTS component 280 may generate output data 385 that only includes the text data of the prompt. The TTS component 280 may send [18] the output data 385 and/or additional data received from the dialog execution engine 370 or the application 290 to the orchestrator component 230 and the orchestrator component 230 may send [19] the output data 385 and/or the additional data to the dialog state manager 340, which may update the dialog state data 345 again.

In some examples, the core dialog manager 360 may determine that the dialog state data 345 includes enough information to select an action and generate a dispatch request to dispatch the selected action and/or dialog state to a corresponding application. For example, in response to a user request to "book me a cab to Favorite Bar," the core dialog manager 360 may determine that the intent is to book a cab (e.g., GetCabIntent) and may generate candidate actions associated with booking a cab, such as a first action using a first application (e.g., Skill A) and a second action using a second application (e.g., Skill B). The core dialog manager 360 may communicate with the first application and/or the second application to acquire more information, such as whether cars are available (e.g., Skill A indicates that no cars are available for 30 minutes, whereas Skill B indicates that a car is available within 5 minutes). Based on the dialog state data 345 and the additional information, the core dialog manager 360 may select the second action and generate a dispatch command, with the action data 365 indicating that the system 100 should dispatch the second action to the second application.

In some examples, dispatching the second action to the second application corresponds to sending the second action (e.g., Dispatch(Skill B: GetCabIntent(Current location: 2121 $7^{th}$ Avenue Seattle, Destination: Favorite Bar)) to the second application for execution. However, the second action is determined by the core dialog manager 360 processing the dialog state data 345 and the core dialog manager 360 is not specifically trained for intents/actions associated with the second application. Therefore, dispatching the second action to the second application may instead correspond to updating the dialog state data 345 with the second action and/or any additional information and sending the dialog state data 345 to the second application for further processing. For example, the core dialog manager 360 may send the selected action (e.g., Dispatch(Skill B: GetCabIntent(Current location: 2121 $7^{th}$ Avenue Seattle, Destination: Favorite Bar)), the additional information (e.g., Skill A indicates that cars are not available for 30 minutes, Skill B indicates that cars are available within 5 minutes) and/or any other information (e.g., Reason: Skill A outage) to the dialog state manager 340, the dialog state manager 340 may update the dialog state data 345 accordingly and the updated dialog state data 345 may be sent to the second application.

While the examples described above illustrate the second action including an intent (e.g., Dispatch(Skill B: GetCabIntent)), the disclosure is not limited thereto and the second action may only correspond to dispatching to the second application (e.g., Dispatch(Skill B)). Thus, the core dialog manager 360 may generate candidate actions corresponding to a specific intent associated with a specific application, or the candidate actions may correspond to a specific application regardless of intent. To illustrate an example of the candidate actions including specific intents, the core dialog manager 360 may generate Dispatch(Skill B: GetCabIntent), Dispatch(Skill B: ViewNearbyCabsIntent), Dispatch(Skill A: GetCabIntent), Dispatch(Skill A: ViewNearbyCabsIntent), etc. and selecting a single action indicates both the application (e.g., Skill A or Skill B) and the intent (e.g., GetCabIntent or ViewNearbyCabsIntent). Thus, selecting the candidate action corresponds to selecting an intent associated with a specific application, which may assist the core dialog manager 360 in selecting between different applications. Additionally or alternatively, the core dialog manager 360 may generate candidate actions based on available applications, regardless of intent. For example, the core dialog manager 360 may generate Dispatch(Skill A), Dispatch(Skill B), etc. and selecting a single action indicates the application to which to dispatch the dialog state data 345. Thus, selecting the candidate action corresponds to sending the dialog state data 345 to the specific application (e.g., Skill B) and the application determines the intent.

In some examples, the core dialog manager 360 may determine that the dialog state data 345 does not include enough information to select an action and generate a dispatch command to dispatch the selected action and/or dialog state to a corresponding application. Instead, the core dialog manager 360 may determine that additional information is needed from the user and may generate a dialog request to solicit the user for the additional information. For example, if the core dialog manager 360 determines one or more intents/actions that may correspond to the speech, but none of the intents/actions are associated with a confidence value meeting or exceeding a threshold value, the core dialog manager 360 may generate a dialog request that requests additional information. While the core dialog manager 360 may dispatch an action despite the confidence score being below the threshold value, a lower confidence score corresponds to an increased likelihood that the selected action is not what the user intended. Thus, dispatching the action may result in performing a command that is different than the user requested, resulting in a lower user satisfaction value after the command is executed.

In order to increase the likelihood that the action selected by the core dialog manager 360 corresponds to the user request, the core dialog manager 360 may generate a dialog request requesting additional information and/or clarification from the user. For example, in response to a request to "book a flight to Portland," the core dialog manager 360 may generate a dialog request and the server(s) 120 may solicit the user as to whether Portland corresponds to Portland, Oregon or Portland, Maine (e.g., "Would you like to fly to Portland, Oregon, or to Portland, Maine?"). For example, the action data 365 may include the dialog request and the dialog execution engine 370 may interpret the action data 365 to generate a prompt corresponding to the solicitation. As discussed above, the solicitation may take the form of text output via a display of a user device or audio output by a speaker of a user device. In addition, the solicitation may be output by a device different from the device that received the speech. For example, the first device 110$a$ may generate the input audio data but the second device 110$b$ may output the solicitation to the user. Accordingly, if the solicitation to the user is to be audio, the TTS component 280 may generate output audio data based on the text data of the prompt and the second device 110$b$ may output audio corresponding to the output audio data.

As discussed above and described in greater detail below with regard to FIGS. 9-10 and 13, the machine learning models (e.g., trained models) used in the core dialog manager 360 may be trained to optimize an expected sum of user satisfaction values. Thus, the core dialog manager 360 may determine whether to select a dialog request or a dispatch request in order to maximize an overall user satisfaction instead of maximizing a discrete change in user satisfaction. For example, requesting additional information from the user may result in a slight decrease in a user satisfaction value, but dispatching an action that executes an incorrect command (e.g., command that does not correspond to the user request) may result in a large decrease in a user satisfaction value. Thus, if the core dialog manager 360 is trained to maximize user satisfaction values during a discrete period of time, the core dialog manager 360 may select the dispatch request to avoid irritating the user and lowering the user satisfaction value with the dialog request. In contrast, if the core dialog manager 360 is trained to maximize an expected sum of user satisfaction values, the core dialog manager 360 may select the dialog request to acquire additional information prior to dispatching the action and/or executing a command.

In some examples, the server(s) 120 may use dialog data to improve output data. To illustrate an example, the server(s) 120 may modify a tone associated with output audio data based on a user satisfaction value. For example, if the user satisfaction value indicates that the user is happy, the server(s) 120 may generate the output audio data using a "happy tone," whereas if the user satisfaction value indicates that the user is unhappy, the server(s) 120 may generate the output audio data using a neutral tone. Thus, by tracking user satisfaction values over time, the server(s) 120 may acquire more information with which to optimize user satisfaction and/or modify the output data based on the user satisfaction.

While FIG. 3 illustrates specific routing between components, this is intended to illustrate a single example and the disclosure is not limited thereto. For example, FIG. 3 illustrates the action data 365 being sent from the core dialog manager 360 to the orchestrator component 230 and from the orchestrator component 230 to the dialog state manager 340, and updated dialog data (including the action data 365) being sent from the dialog state manager 340 to the orchestrator component 230, from the orchestrator component 230 to the dialog execution engine 370, and from the dialog execution engine 370 to the application A 290$a$. However, the disclosure is not limited thereto and the dialog data can be routed to any of the components illustrated in FIG. 3 without departing from the disclosure. Thus, any decision making performed by any component in the system 100 may be performed using information (e.g., dialog state data 345) stored in the dialog state manager 340 without departing from the disclosure.

In addition, while FIG. 3 illustrates the core dialog manager 360 as a discrete component that is configured to determine action data 365, the disclosure is not limited thereto. This is an example of a centralized model with a single decision point, with a single core dialog manager 360 configured to make decisions (e.g., determine actions to perform and/or select a specific action to perform). Instead of a centralized model, the system 100 may implement a decentralized model in which there are multiple decision points across the system 100 and the core dialog manager 360 may be configured to assist other components in making a decision. For example, the core dialog manager 360 may assist the user satisfaction estimator 350 in determining a user satisfaction value, may assist the TTS component 280 (e.g., determining a tone associated with the output audio), or the like without departing from the disclosure. Thus, whenever a component has a decision to make and/or multiple options to choose from, the core dialog manager 360 may assist the component in making the decision. This enables the core dialog manager 360 to optimize user satisfaction over time and make this optimization available to the other components of the system 100.

While FIG. 3 illustrates the core dialog manager 360 as a discrete component configured to make decisions for the system 100, and the example described above illustrates the core dialog manager 360 assisting other components in making decisions, the disclosure is not limited thereto. Instead, the core dialog manager 360 may be completely decentralized and individual components may include machine learning models that enable the component(s) to make decisions and optimize user satisfaction over time (collectively, the machine learning models may correspond to the core dialog manager 360). Thus, the core dialog manager 360 may be illustrated as a single component, as a separate component while also being included within individual components, or only within individual components (e.g., without a separate block receiving [11] dialog data and sending [12] action data) without departing from the disclosure.

Returning to FIG. 1, the server(s) 120 may generate (130) a first dialog state and determine (132) a first user satisfaction value based on the first dialog state. For example, the first dialog state may correspond to the user request being received and the first user satisfaction value may correspond to a user satisfaction value prior to the user request being executed by the server(s) 120.

The server(s) 120 may determine (134) candidate actions based on the first dialog state and may select (136) an action from the candidate actions using a first machine learning model. For example, the core dialog manager 360 may generate the candidate actions and may select the action from the candidate actions. The server(s) 120 may determine (138) that a confidence score is above a threshold value and may send (140) the first dialog state to an application associated with the selected action. For example, the core dialog manager 360 may determine that the confidence score is above the threshold value and therefore additional information is not needed in order to execute the user request.

While FIG. 1 illustrates the server(s) 120 determining whether to perform an action (e.g., send the first dialog state to the application) by comparing the confidence score to a threshold value, the disclosure is not limited thereto. Instead, the server(s) 120 may use any decision making process known to one of skill in the art without departing from the disclosure. For example, the server(s) 120 may determine to perform the action (and/or which action to perform) using a machine learning model, by comparing a distribution of confidence scores, by comparing the confidence score to the threshold value, and/or other techniques without departing from the disclosure. Additionally or alternatively, the server(s) 120 may optimize the threshold value over time, based on user preferences, settings, user input providing feedback, or the like. For example, decreasing the threshold value may increase a likelihood that the confidence score is above the threshold value, reducing a number of dialog requests (e.g., requesting confirmation and/or additional information from a user) that potentially disrupt a user experience.

The server(s) 120 may determine (142) candidate actions based on the first dialog state, may select (144) an action from the candidate actions using a second machine learning model, and may generate (146) prompt data based on the selected action. For example, the application 290 may analyze the first dialog state using the second machine learning model to generate a list of candidate actions, may determine a probability distribution for the candidate actions and may select an action that has a highest probability. Based on the selected action, the application 290 may generate prompt data that indicates to the user the action that was selected and/or additional information. For example, in response to a user request of "book me a cab to downtown," the application 290 may generate prompt data corresponding to "You have booked a ride to downtown using Skill A. A blue Honda Accord will be arriving in 5 minutes."

The server(s) 120 may then determine (148) a second user satisfaction value associated with a current dialog state (e.g., second dialog state) and may optimize (150) the machine learning models based on the user satisfaction values, as will be described in greater detail below with regard to FIG. 13. For example, the first machine learning model (e.g., the core dialog manager 360) may be optimized to select actions and/or applications that optimize a user satisfaction (e.g., user prefers Skill A to Skill B), and the second machine learning model (e.g., the application 290) may be optimized to select actions and/or intents associated with the application 290 that optimize a user satisfaction. This enables functionality of the application 290 to be improved without specific programming or analysis performed by a content owner associated with the application 290. Instead, the content owner may request that the server(s) 120 optimize the functionality of the application 290 and the server(s) 120 may train the second machine learning model to optimize an expected sum of user satisfaction values without direct involvement of the content owner.

Figure 4:
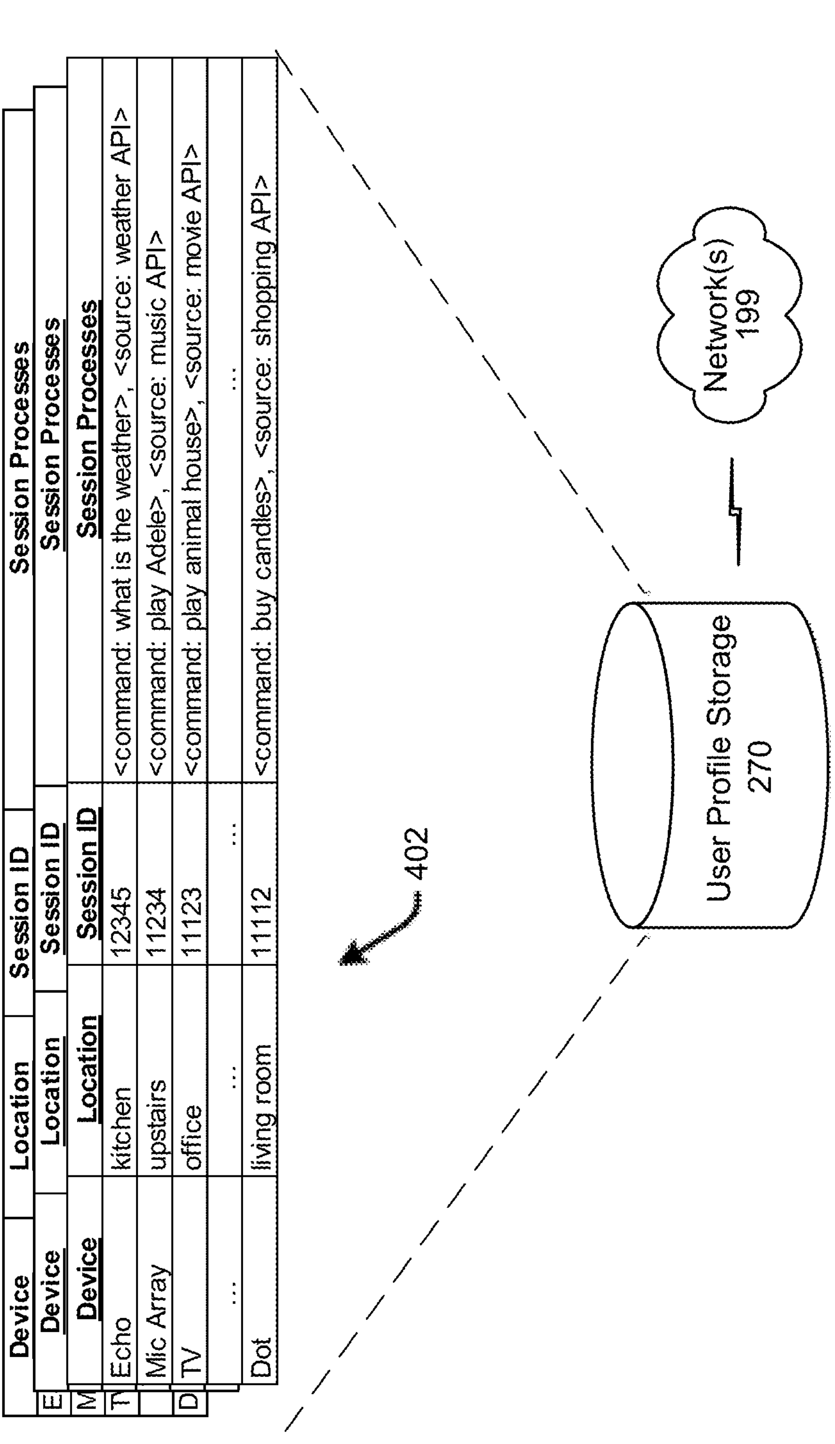
FIG. 4 illustrates data stored and associated with user profiles according to embodiments of the present disclosure.

FIG. 4 illustrates the user profile storage 270 that includes data regarding user accounts 402. For illustration, as shown in FIG. 4, each user profile 402 may include data such as device type information, device location information, session ID information, and processes performed with respect to each session ID. Each user profile 402 may also include information about previous usage history (e.g., number of times an application is used), previous commands/intents, temporal information or the like. In addition, a user profile 402 may store other data as well.

Figure 5:
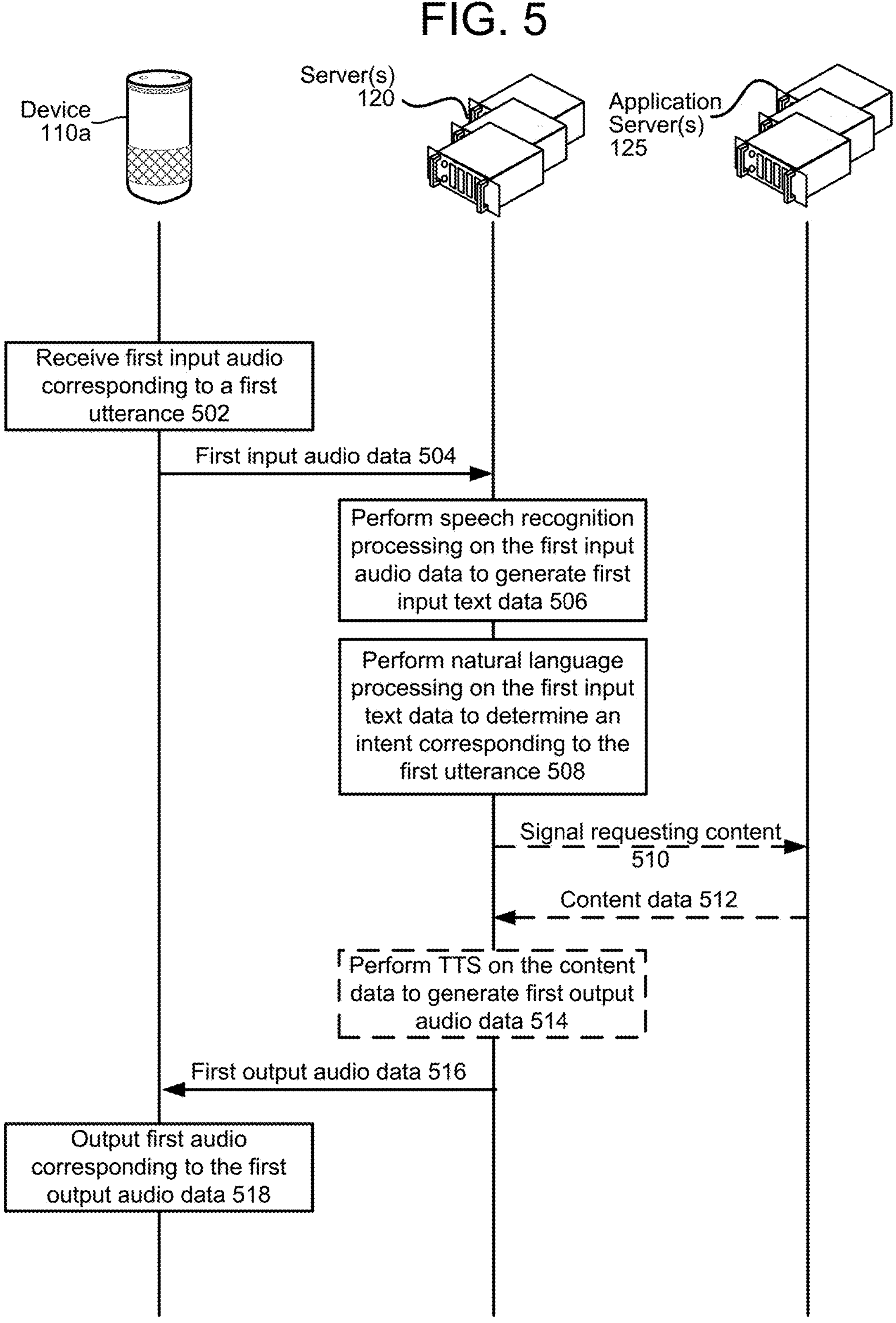
FIG. 5 is a signal flow diagram illustrating an example of processing speech and generating output audio according to embodiments of the present disclosure.

FIG. 5 is a signal flow diagram illustrating an example of processing speech and generating output audio according to embodiments of the present disclosure. A device 110*a* receives (502) input audio corresponding to an utterance of a user. The device 110*a* generates input audio data corresponding to the received input audio and sends (504) the input audio data to the server(s) 120 for processing. Alternatively, a device 110 may capture textual input corresponding to a command of the user, generate input text data based on the textual input, and send the input text data to the server(s) 120 for processing (not illustrated).

If the server(s) 120 receives input audio data, the server(s) 120 performs (506) speech recognition on the input audio data to generate input text data. The server(s) 120 also performs (508) natural language processing on the input text data (either generated by speech recognition processing or received from a device 110) to determine an intent of a user command represented in the utterance of the input audio or the textual input.

The server(s) determines content responsive to the command and determined intent. The content may be stored in a 1P source or a 3P source. If the content is stored by a 3P source, the server(s) 120 sends (510) a signal requesting the content to an application server(s) 125 and receives (512) content data from the application server(s) 125.

If the content data includes text data to be output to a user as synthesized speech, the server(s) 120 performs (514) TTS on the content data to generate output audio data including synthesized speech corresponding to the content. The server(s) 120 sends (516) output audio data to the user device 110*a*. The output audio data may be generated by TTS processing or may be received from the application server(s) 125 as audio data. The device 110*a* outputs (518) audio corresponding to the output audio data.

For ease of illustration, FIG. 5 illustrates a high level signal flow diagram encompassing the overall system for processing speech and generating output audio. However, the server(s) 120 may perform additional steps to determine an intent corresponding to the speech and generate output audio.

In some examples, the server(s) 120 may determine that there is enough information to process the speech and select an action that corresponds to the speech without further input from the user 5. For example, the server(s) 120 may generate one or more candidate actions and select one of the actions using the core dialog manager 360. The server(s) 120 may determine a confidence score associated with the selected action, which indicates a likelihood that the action corresponds to the speech, and if the confidence score is above a threshold value the server(s) 120 may dispatch the action to an application 290 associated with the selected action. Dispatching the action refers to sending an instruction to the application 290 to execute a command, which may be indicated by a framework having slots/fields that correspond to the selected action.

In other examples, the server(s) 120 may determine that there is not enough information to select an action and may request additional information from the user 5. The server(s) 120 may utilize thresholding to determine whether a specific action is being invoked by the user or whether there is insufficient information to select an action. For example, if the server(s) 120 determines one or more intents that may correspond to the speech, but none of the intents are associated with a confidence value meeting or exceeding a threshold value, the server(s) 120 may request additional information. While the server(s) 120 may dispatch the selected action despite the confidence score being below the threshold value, a lower confidence score corresponds to an increased likelihood that the selected action is not what the user 5 intended. Thus, dispatching the selected action may result in performing a command that is different than the user 5 requested, resulting in a lower user satisfaction value after the command is executed.

In order to increase the likelihood that the selected action corresponds to the speech, the server(s) 120 may generate a prompt requesting additional information and/or clarification from the user 5. For example, in response to a request to "book a flight to Portland," the server(s) 120 may generate a prompt that solicits the user as to whether Portland corresponds to Portland, Oregon or Portland, Maine (e.g., "Would you like to fly to Portland, Oregon, or to Portland, Maine?"). The solicitation may take the form of text output via a display of a user device or audio output by a speaker of a user device. The solicitation may be output by a device different from the device that received the speech. For example, the device 110*a* may generate the input audio data but the device 110*b* may output the solicitation to the user. Accordingly, if the solicitation to the user is to be audio, the TTS component 280 may generate output audio data based on the text data of the prompt and the device 110 may output audio corresponding to the output audio data.

In response to the output audio, the user may provide additional information. Thus, the server(s) 120 may receive second input audio data and perform speech recognition processing and natural language process on the second input audio data to determine the additional information. If the additional information clarifies the request, the server(s) 120 may select an action having a confidence score above the threshold value and execute a command.

FIG. 6 is a flowchart illustrating an example method of processing speech to determine an action according to embodiments of the present disclosure. As illustrated in FIG. 6, the server(s) 120 may receive (602) first input audio corresponding to a first utterance and perform (604) speech language recognition processing on the first input audio data to generate first input text data, which may be performed by the speech recognition component 250. The server(s) 120 may then perform (606) natural language processing on the first input text data to determine intent data corresponding to the first utterance, which may be performed using the natural language component 260. The server(s) 120 may determine (608) context data, which may be performed by the context service component 320, and determine (610) personal graph data, which may be performed by the personal graph service component 330.

The server(s) 120 may generate (612) a dialog state, which may be performed by the dialog state manager 340. For example, the dialog state manager 340 may receive the information from the speech recognition component 250, the natural language component 260, the context service component 320 and/or the personal graph service component 330 and may generate the dialog state representing a current state of the dialog (e.g., conversation exchange) between the system 100 and the user 5.

The server(s) 120 may determine (614) a user satisfaction value, which may be performed by the user satisfaction estimator 350. For example, the user satisfaction estimator 350 may receive the dialog state from the dialog state manager 340 and may determine a scalar value between 1 and 5 that approximates a current satisfaction of the user.

The server(s) 120 may determine (616) action data from the dialog state and may determine (618) if there is enough information to dispatch the dialog state to an application, which may be performed by the core dialog manager 360. For example, the core dialog manager 360 may perform rule-based and machine-learning based steps to identify a selected action and determine if a confidence score associated with the selected action is above a threshold value, as will be discussed in greater detail below with regard to FIG. 10.

The server(s) 120 may determine (620) whether to dispatch the dialog state to an application or to prompt the user for additional information, which may be performed by the dialog execution engine 370. If the server(s) 120 determine not to dispatch the dialog state to the application, the server(s) 120 may generate (628) prompt data requesting more information, which may be performed by the dialog execution engine 370. The prompt data may solicit the user to provide additional information with which the server(s) 120 may more accurately determine the command requested by the user. For example, the prompt data may correspond to a prompt of "Would you like to fly to Portland, Oregon, or to Portland, Maine."

If the server(s) 120 determine to dispatch the dialog state to an application, the server(s) 120 may send the dialog state to a selected application 290 corresponding to the selected action indicated in the action data. The server(s) 120 may determine (624) action data from the dialog state may generate (626) prompt data based on the action data. For example, a dialog manager specific to the application 290 may determine the action data (e.g., selected action, and a dialog execution engine specific to the application 290 may generate the prompt data, which will be described in greater detail below with regard to FIGS. 11-12.

The server(s) 120 may perform (630) text-to-speech (TTS) on the prompt data to generate first output audio data, which may be performed by the text-to-speech component 280, and may send (632) the first audio data to a device 110 to output audio to the user.

As discussed above, the server(s) 120 may determine whether to dispatch the dialog state to the selected application or to request additional information from the user to clarify the requested command. While requesting additional information improves the confidence score associated with an action and increases a likelihood that the server(s) 120 accurately executes the command requested by the user, soliciting additional information delays execution of the command and requires additional attention from the user, which may decrease a user satisfaction.

In determining whether to dispatch the dialog state or request additional information, the server(s) 120 may prioritize increasing user satisfaction with every decision. For example, the server(s) 120 may determine that not requesting additional information corresponds to a higher user satisfaction value (e.g., 5) whereas requesting additional information corresponds to a lower user satisfaction value (e.g., 3) and may determine not to request the additional information. However, while this maximizes the user satisfaction during a particular moment in time, this may not maximize overall user satisfaction, particularly when the server(s) 120 executes a command that the user did not request.

To illustrate an example, the server(s) 120 may receive a request to "book a reservation for 5 people" but may incorrectly process the request as a command to "book a reservation for 50 people." While requesting additional information and/or clarification would slightly reduce user satisfaction at the moment that the user had to provide the additional information, not requesting the additional information and executing the command to make a reservation for 50 people would drastically reduce user satisfaction at the moment that the user arrived for the reservation.

To optimize overall user satisfaction, instead of comparing user satisfaction values at each decision, the server(s)

120 may compare an expected sum of user satisfaction values. For example, the server(s) 120 may determine a first expected sum of user satisfaction values if additional information was requested but the command was correctly processed and a second expected sum of user satisfaction values if additional information was not requested and the command was incorrectly processed. Thus, while requesting the additional information reduces a current user satisfaction value, the first expected sum of user satisfaction values would be much higher than the second expected sum of satisfaction values. Training the machine learning models to optimize the expected sum of user satisfaction value will be described in greater detail below with regard to FIG. 13.

FIG. 7 illustrates examples of inputs to and outputs from a dialog state manager according to embodiments of the present disclosure. As illustrated in FIG. 7, the dialog state manager 340 may receive a number of different inputs and may generate dialog state data 345 (e.g., information corresponding to a current dialog state of the system 100). In some examples, the dialog state manager 340 may receive inputs directly from other components, such as receiving context data 325 from context services 320, personal graph data 335 from personal graph services 330, user satisfaction data 355 from user satisfaction estimator 350, or the like. However, the disclosure is not limited thereto and the dialog state manager 340 may receive inputs indirectly via the orchestrator 230, such as input audio data 305, N-best recognitions data 310, N-best intents data 315, action data 365, or the like.

As discussed above with regard to FIG. 3, the dialog state manager 340 may generate and/or update the dialog state data 345 with different information at different times. Thus, the dialog state data 345 includes information correspond to a current state of dialog (e.g., exchange) between the system 100 and the user 5. For example, the dialog state manager 340 may generate the dialog state data 345 based on initial data received from the orchestrator 230 at a first time (e.g., input audio data 305, N-best recognitions data 310, N-best intents data 315, etc.) and may update the dialog state with additional information at a second time (e.g., context data 325, personal graph data 335, etc.). The dialog state manager 340 may then output the dialog state data 345 to the user satisfaction estimator 350 and receive the user satisfaction data 355 based on the dialog state data 345, which may be used to update the dialog state data 345 at a third time. The dialog state data 345 may then be output to the orchestrator 230 and/or the core dialog manager 360 to generate the action data 365 and/or the output data 385. The dialog state manager 340 may receive the action data 365 at a fourth time and/or the output data 385 at a fifth time and update the dialog state data 345 accordingly.

FIG. 7 illustrates examples of the dialog state data 345 (e.g., "s"). For example, the input audio data 305 is illustrated as an audio signal. The N-best recognitions data 310 is illustrated as ASR results including a first result of "book me a cab," which has a confidence score of 90, and a second result of "book me a can," which has a confidence score of 10. The N-best intents data 315 is illustrated as NLU results including a first result of GetCabIntent, which has a confidence score of 0.95, and a second result of BuyItemIntent, which has a confidence score of 0.31. The context data 325 is illustrated as including Current City: Seattle and Current Restaurant: Favorite Bar, which provides location information about the user. The personal graph data 335 is illustrated as indicating a frequency of previous usage of different applications, such as Skill A Usage: 10 and Skill B Usage: 1, along with specific location information (e.g., Location: 2121 7th Avenue, Seattle). The user satisfaction data 355 can be represented as a score between 1 and 5 and FIG. 7 illustrates the user satisfaction data 355 as a value of 4.5. The action data 365 and/or the output data 885 corresponds to a current application, a selected action, and/or additional information associated with selecting the action. For example, FIG. 7 illustrates the action data 365 as including a most recently selected action (e.g., Last Selected Action: (Dispatch, Skill B, Reason: Skill A indicates an Outage)) along with additional information (e.g., Skill A—Time >30 m; Skill B—Time<5 m). In addition to this information, the output data 385 may indicate a current application (e.g., Engaged Skill=Skill A), a most recent prompt (e.g., "The closest ride is 5 minutes away. Is the destination the Favorite Bar?"), or the like.

While FIG. 7 illustrates examples of information corresponding to a dialog state, the disclosure is not limited thereto and the information included in the dialog state data 345 may vary without departing from the disclosure.

FIG. 8 illustrates examples of inputs to and outputs from a user satisfaction estimator according to embodiments of the present disclosure. As illustrated in FIG. 8, the user satisfaction estimator 850 may receive the dialog state data 345 from the dialog state manager 340 and may generate user satisfaction data 355. The user satisfaction estimator 350 is configured to determine an emotive context of the user (e.g., user satisfaction), which is represented as a scalar value between 1 and 5 that indicates whether the user is satisfied (e.g., "5") or unsatisfied (e.g., "1") at a particular point in time.

To determine whether the user is pleased or displeased, the user satisfaction estimator 350 may analyze every input for evidence of the user's emotional state. For example, the user satisfaction estimator 350 may analyze the input audio data 305 to detect variations in the user's speech, such as a change in tone (e.g., the user angrily shouting), speech speed or speech frequency. Similarly, the user satisfaction estimator 350 may analyze (e.g., perform content analysis) the output of the speech processing component 240 (e.g., text corresponding to the user's speech) to determine whether the user's speech is positive, negative or neutral. In some examples, the device 110 may include a camera configured to capture image data and the user satisfaction estimator 350 may analyze the image data using facial recognition or the like to identify facial expressions and determine if the facial expressions are positive, negative or neutral.

The user satisfaction estimator 350 may include three components that include machine learning models; a prosody component 840, a sentiment analysis component 845, and a satisfaction estimator 850. As illustrated in FIG. 8, the audio (e.g., input audio data 305) and the text (e.g., N-best recognition data 310) are processed separately by the first two machine learning models (e.g., the prosody component 840 and the sentiment analysis component 845, respectively) and outputs are fed into the third machine learning model (e.g., the satisfaction estimator 850), along with the remaining inputs. While FIG. 8 illustrates the user satisfaction estimator 350 including all three machine learning models, the disclosure is not limited thereto and the user satisfaction estimator 350 may include only a single machine learning model without departing from the disclosure. For example, the satisfaction estimator 850 may map the dialog state to the user satisfaction value without intermediate prediction.

The dialog state data 345 received by the user satisfaction estimator 350 may include the input audio data 305, the N-best recognitions data 310, user feedback data 815, an Estimated Turn Error Rate (ETER) 820, the context data 325, memory data 830, and/or the like.

As discussed above, the prosody component 840 may analyze the input audio data 305 to determine the frequency and the amplitude of the user's speech, which may indicate whether the user's is satisfied or unsatisfied. As used herein, audio property data may represent at least one of the frequency or the amplitude of the user's speech and the audio property data may be associated with the input audio data 305. The user feedback data 815 may correspond to explicit user feedback indicating whether the user is satisfied or unsatisfied, such as a verbal indication of positive or negative feedback. The server(s) 120 may estimate if the ASR and/or NLU made a mistake, which is indicated by an estimated turn error rate (ETER) 820.

The prosody component 840 may be configured to identify changes in tone (e.g., happy, sad, etc.) and determine whether the changes in tone correspond to a user satisfaction. For example, the prosody component 840 may detect fluctuations in speech indicating that the user is annoyed or frustrated, which corresponds to a decreased user satisfaction. Additionally or alternatively, the sentiment analysis component 845 may be configured to analyze the N-best recognitions data and identify a sentiment (e.g., positive, neutral, negative) associated with the utterance. For example, if the user cancels an action or inputs the same command repeatedly, the sentiment analysis component 845 may determine that the user is unsatisfied and that the server(s) 120 are not performing the desired action. Similarly, if the utterance corresponds to a negative comment (e.g., "This machine is so dumb!"), the sentiment analysis component 845 may interpret the utterance as an indication that the user satisfaction is low.

In some examples, the user satisfaction estimator 350 may receive image data and may perform computer vision processing to determine information about a user satisfaction based on facial expressions or the like. For example, the user satisfaction estimator 350 may identify common facial expressions and associate the facial expressions with a user satisfaction value, such as a smile corresponding to a high user satisfaction value and a frown corresponding to a low user satisfaction value.

The memory data 830 indicates stored preferences or annotations associated with the user 5, the device 110 and/or the system 100. For example, the user may indicate "Alexa, remember that I hate mushrooms," "Alexa, my passcode is 12345," "Alexa, I will not go to this restaurant anymore," or the like, and the system 100 may store this information to improve future processing. In some examples the memory data 830 may correspond to the personal graph data 335, although the disclosure is not limited thereto. As illustrated in FIG. 8, the memory data 830 may include user profile data 835 that is associated with the user.

The satisfaction estimator 850 may generate user satisfaction data 355, which includes the user satisfaction value (e.g., value between 1 and 5) indicating a current estimate of the user satisfaction (e.g., predicted user satisfaction r). The user satisfaction data 355 may be sent to the dialog state manager 340 to update the dialog state data 345. In addition, the user satisfaction data 355 may be sent to a performance tracker 860 that may track the user satisfaction values over a period of time. The performance tracker 860 may enable the system 100 to track the user's conversational experience and to estimate the user satisfaction given a current dialog state.

As will be discussed in greater detail below with regard to FIG. 13, the user satisfaction data 355 is an important data point that enables a machine learning model to optimize an expected sum of user satisfaction values. Thus, the user satisfaction data 355 acts as feedback to enable the system 100 to make decisions and/or select actions that improve user satisfaction overall.

The user satisfaction estimator 350 (e.g., the prosody component 840, the sentiment analysis component 845, and/or the satisfaction estimator 850), the core dialog manager 360 (e.g., DNN candidate generator 930, DNN selector 954, etc.), the application 290 (e.g., DNN selector 1154, etc.), and/or other components in the system 100 may implement one or more machine learning models. A ground truth may be established for purposes of training the one or more machine learning models. In machine learning, the term "ground truth" refers to the accuracy of a training set's classification for supervised learning techniques.

Various machine learning techniques may be used to train and operate the user satisfaction estimator 350, the core dialog manager 360 and/or the application 290. Such techniques may include backpropagation, statistical learning, supervised learning, semi-supervised learning, stochastic learning, or other known techniques. Such techniques may more specifically include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category. The user response to content output by the system may be used to further train the machine learning model(s).

Figure 9:
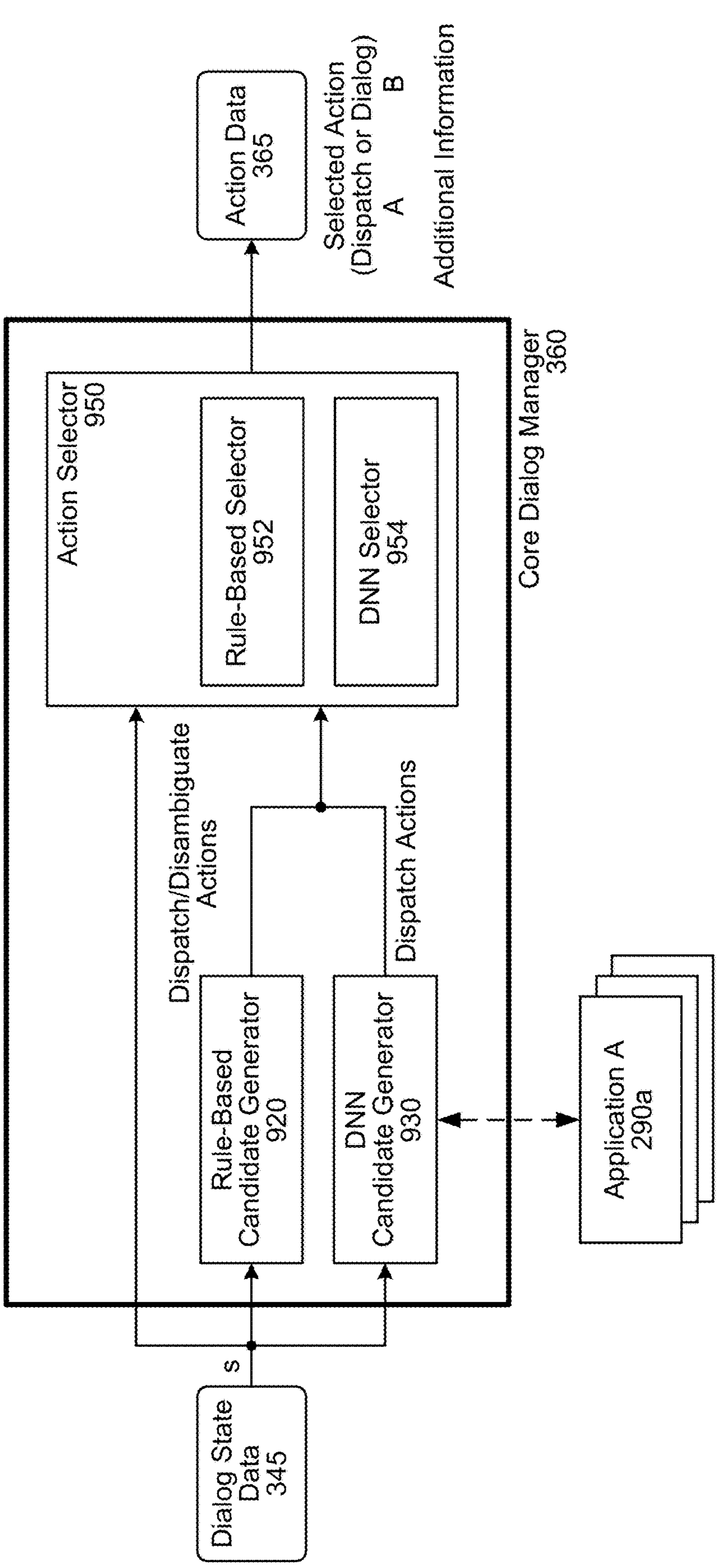
FIG. 9 illustrates examples of processing performed by a core dialog manager according to embodiments of the present disclosure.

FIG. 9 illustrates examples of processing performed by a core dialog manager according to embodiments of the present disclosure. As illustrated in FIG. 9, the core dialog manager 360 may include a rule-based candidate generator 920, a DNN candidate generator 930 and an action selector 950, which may further include a rule-based selector 952 and a DNN selector 954. The rule-based candidate generator 920 and the rule-based selector 952 may be programmed using one or more rules that apply in certain situations. Thus, when inputs to the rule-based candidate generator 920 and/or the rule-based selector 952 satisfy certain criteria indicated by an applicable rule, the rule-based candidate generator 920 and the rule-based selector 952 generate outputs based on the applicable rule. In contrast, the DNN candidate generator 930 and the DNN selector 954 include machine learning models that are not explicitly programmed but instead are trained over time. Thus, the DNN candidate generator 930 and the DNN selector 954 receive inputs and generate outputs based on the machine learning models. As discussed above and described in greater detail below with regard to FIG. 13, the machine learning models may be trained to optimize an expected sum of user satisfaction values. The components illustrated in FIG. 9 will be described in greater detail with regard to the flowchart illustrated in FIG. 10.

FIG. 10 is a flowchart illustrating an example method of determining an action and associated application according to embodiments of the present disclosure. As illustrated in FIG. 10, the server(s) 120 may receive (1010) a dialog state (e.g., dialog state data 345), apply (1012) a rule-based candidate generator to determine first candidate action(s) and apply (1014) a machine-learning candidate generator to determine second candidate action(s). For example, the rule-based candidate generator 920 may apply a set of rules to determine the first candidate action(s), while the DNN candidate generator 930 may use a machine learning model to determine the second candidate action(s). The first candidate action(s) may correspond to dispatch actions and/or disambiguate actions, whereas the second candidate action(s) may correspond to dispatch actions.

The server(s) 120 may also request (1016) additional information from application(s) and receive (1018) the additional information from the application(s). For example, the DNN candidate generator 930 may query a first application (e.g., Skill A) whether cars are available near the user and may receive an indication that no cars are available for 30 minutes. The DNN candidate generator 930 may then query a second application (e.g., Skill B) whether cars are available near the user and may receive an indication that cars are available within 5 minutes.

The server(s) 120 may apply (1020) a rule-based selector to select from the first and second candidate action(s) and may determine (1022) whether there is an applicable rule to select from the candidate action(s). If at least one of the rules is applicable, the server(s) 120 may select (1024) an action based on the rule. For example, the rule-based selector 952 may apply a set of rules and select one of the candidate action(s) if one of the rules is applicable. If none of the rules are applicable, and optionally in some examples even when some of the rules are applicable, the server(s) 120 may determine (1026) a probability distribution for the first and second candidate action(s) and may select (1028) an action with a highest probability from the first and second candidate action(s). For example, the DNN selector 954 may generate the probability distribution for the first and second candidate action(s) and may select a single candidate action having the highest probability.

The server(s) 120 may determine (1030) a confidence score corresponding to the selected action and may determine (1032) whether the confidence score is above a threshold value. For example, the server(s) 120 may determine the confidence score indicating a likelihood that the selected action corresponds to the user request. If the confidence score is above the threshold value, the server(s) 120 may generate (1034) a dispatch request corresponding to the selected action. For example, the dispatch request may indicate that the server(s) 120 should send the dialog state, an intent associated with the selected action, and/or other data to a corresponding application. If the confidence score is below the threshold value, the server(s) 120 may generate (1036) a dialog request that requests additional information from the user. For example, the dialog request may solicit additional information to clarify the user request. The server(s) 120 may send (1038) the dialog/dispatch request. For example, the core dialog manager 360 may send action data 365, which may include the dispatch request (A) and/or dialog request (B), along with additional information acquired by the DNN candidate generator 930, to the dialog execution engine 370 for further processing.

While FIG. 10 illustrates the server(s) 120 determining whether to perform an action (e.g., send the dialog state to the application) by comparing the confidence score to a threshold value, the disclosure is not limited thereto. Instead, the server(s) 120 may use any decision making process known to one of skill in the art without departing from the disclosure. For example, the server(s) 120 may determine to perform the action (and/or select which action to perform) using a machine learning model, by comparing a distribution of confidence scores, by comparing the confidence score to the threshold value, and/or other techniques without departing from the disclosure. Additionally or alternatively, the server(s) 120 may optimize the threshold value over time, based on user preferences, settings, user input providing feedback, or the like. For example, decreasing the threshold value may increase a likelihood that the confidence score is above the threshold value, reducing a number of dialog requests (e.g., requesting confirmation and/or additional information from a user) that potentially disrupt a user experience.

If the action data 365 corresponds to a dialog request, the dialog execution engine 370 may generate a prompt and send the prompt and/or the dialog state to the TTS component 280. The TTS component 280 may generate output audio data corresponding to the prompt that requests the additional information from the user, which may be sent to the device 110.

If the action data 365 corresponds to a dispatch request, the dialog execution engine 370 may send the dialog state, the intent associated with the action data 365, and/or the action data 365 to the application 290. For example, the dialog execution engine 370 may send the dialog state to the application 290 and the application 290 may generate a prompt and updated dialog state and send the prompt and the updated dialog state to the TTS component 280, which is described in greater detail below with regard to FIGS. 11-12.

Figure 11:
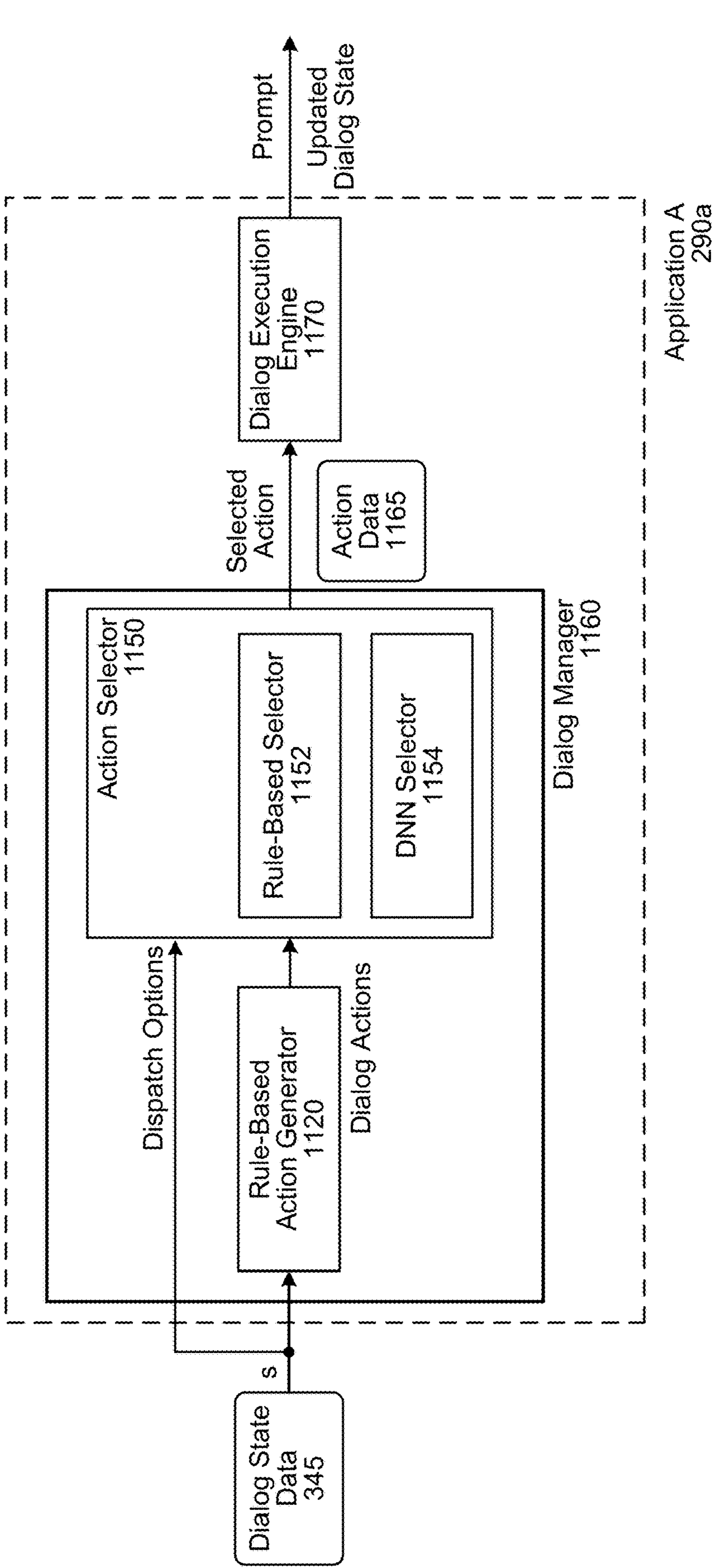
FIG. 11 illustrates examples of processing performed by an application-specific dialog manager according to embodiments of the present disclosure.

FIG. 11 illustrates examples of processing performed by an application-specific dialog manager according to embodiments of the present disclosure. As illustrated in FIG. 11, the application A **290*a* includes a dialog manager 1160 and a dialog execution engine 1170. The dialog manager 1160 may include a rule-based action generator 1120 and an action selector 1150, which may further include a rule-based selector 1152 and a DNN selector 1154. The rule-based action generator 1120 and the rule-based selector 1152 may be programmed using one or more rules that apply in certain situations. Thus, when inputs to the rule-based candidate generator 1120 and/or the rule-based selector 1152 satisfy certain criteria indicated by an applicable rule, the rule-based candidate generator 1120 and the rule-based selector 1152 generate outputs based on the applicable rule. In contrast, the DNN selector 1154 include machine learning models that are not explicitly programmed but instead are trained over time. Thus, the DNN selector 1154 receive inputs and generate outputs based on the machine learning models. As discussed above and described in greater detail below with regard to FIG. 13, the machine learning models may be trained to optimize an expected sum of user satisfaction values. The components illustrated in FIG. 11 will be described in greater detail with regard to the flowchart illustrated in FIG. 12**.

Figure 12:
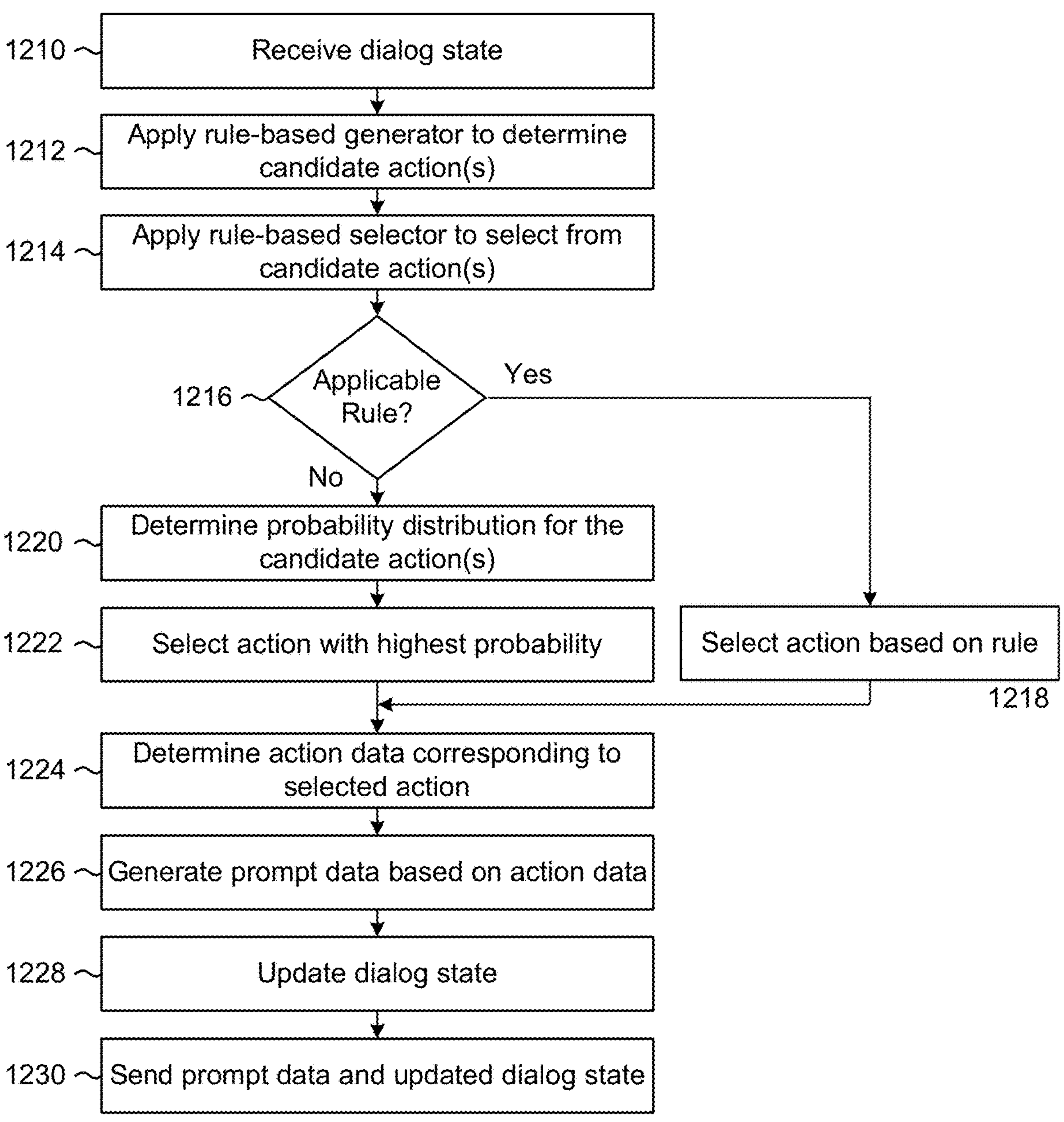
FIG. 12 is a flowchart illustrating an example method of an application determining an action according to embodiments of the present disclosure.

FIG. 12 is a flowchart illustrating an example method of an application determining an action according to embodiments of the present disclosure. As illustrated in FIG. 12, the application 290 may receive (1210) the dialog state (e.g., dialog state data 345) from the dialog execution engine 370, may apply (1212) a rule-based candidate generator to determine candidate action(s), may apply (1214) a rule-based selector to select from the candidate action(s), and may determine (1216) whether there is an applicable rule to select from the candidate action(s). For example, the rule-based action generator 1120 may apply a set of rules to determine the candidate action(s) and the rule-based selector 1152 may apply a set of rules to select from the candidate actions.

If at least one of the rules is applicable, the application 290 may select (1218) an action based on the rule. For example, the rule-based selector 1152 may apply a set of rules and select one of the candidate action(s) if one of the rules is applicable. If none of the rules are applicable, and optionally in some examples even when some of the rules are applicable, the application 290 may determine (1220) a probability distribution for the candidate action(s) and may select (1222) an action with a highest probability from the candidate action(s). For example, the DNN selector 1154 may generate the probability distribution for the candidate action(s) and may select a single candidate action having the highest probability.

The application 290 may determine (1224) action data corresponding to the selected action, may generate (1226) prompt data based on the action data, may update (1228) the dialog state to include the action data, and may send (1230) the prompt data and/or the updated dialog state to the server(s) 120. For example, the action selector 1150 may determine the action data 1165 corresponding to the selected action and send the action data 1165 to the dialog execution engine 1170. The dialog execution engine 1170 may generate the prompt data and update the dialog state and may send the prompt data and the updated dialog state to the TTS component 280.

In some examples, the application 290 may be a component included as part of the server(s) 120. For example, the application 290 may be similar to the other components illustrated in FIG. 3 but may be specifically programmed for the application 290. However, the disclosure is not limited thereto and the application 290 may be a separate component that is not included in or associated with the server(s) 120. In some examples, the application 290 may be a component included in the application server(s) 125 without departing from the disclosure.

As discussed above, the server(s) 120 may determine whether to dispatch the dialog state to the selected application or to request additional information from the user to clarify the requested command. While requesting additional information improves the confidence score associated with an action and increases a likelihood that the server(s) 120 accurately executes the command requested by the user, soliciting additional information delays execution of the command and requires additional attention from the user, which may decrease a user satisfaction.

In determining whether to dispatch the dialog state or request additional information, the server(s) 120 may prioritize increasing user satisfaction with every decision. For example, the server(s) 120 may determine that not requesting additional information corresponds to a higher user satisfaction value (e.g., 3) whereas requesting additional information corresponds to a lower user satisfaction value (e.g., 2) and may determine not to request the additional information. However, while this maximizes the user satisfaction during a particular moment in time, this may not maximize overall user satisfaction, particularly when the server(s) 120 executes a command that the user did not request.

To illustrate an example, the server(s) 120 may receive a request to "book a reservation for 5 people" but may incorrectly process the request as a command to "book a reservation for 50 people." While requesting additional information and/or clarification would slightly reduce user satisfaction at the moment that the user had to provide the additional information, not requesting the additional information and executing the command to make a reservation for 50 people would drastically reduce user satisfaction at the moment that the user arrived for the reservation.

To optimize overall user satisfaction, instead of comparing user satisfaction values at each decision, the server(s) 120 may compare an expected sum of user satisfaction values. For example, the server(s) 120 may determine a first expected sum of user satisfaction values if additional information was requested but the command was correctly processed and a second expected sum of user satisfaction values if additional information was not requested and the command was incorrectly processed. Thus, while requesting the additional information reduces a current user satisfaction value, the first expected sum of user satisfaction values would be much higher than the second expected sum of satisfaction values.

Figure 13:
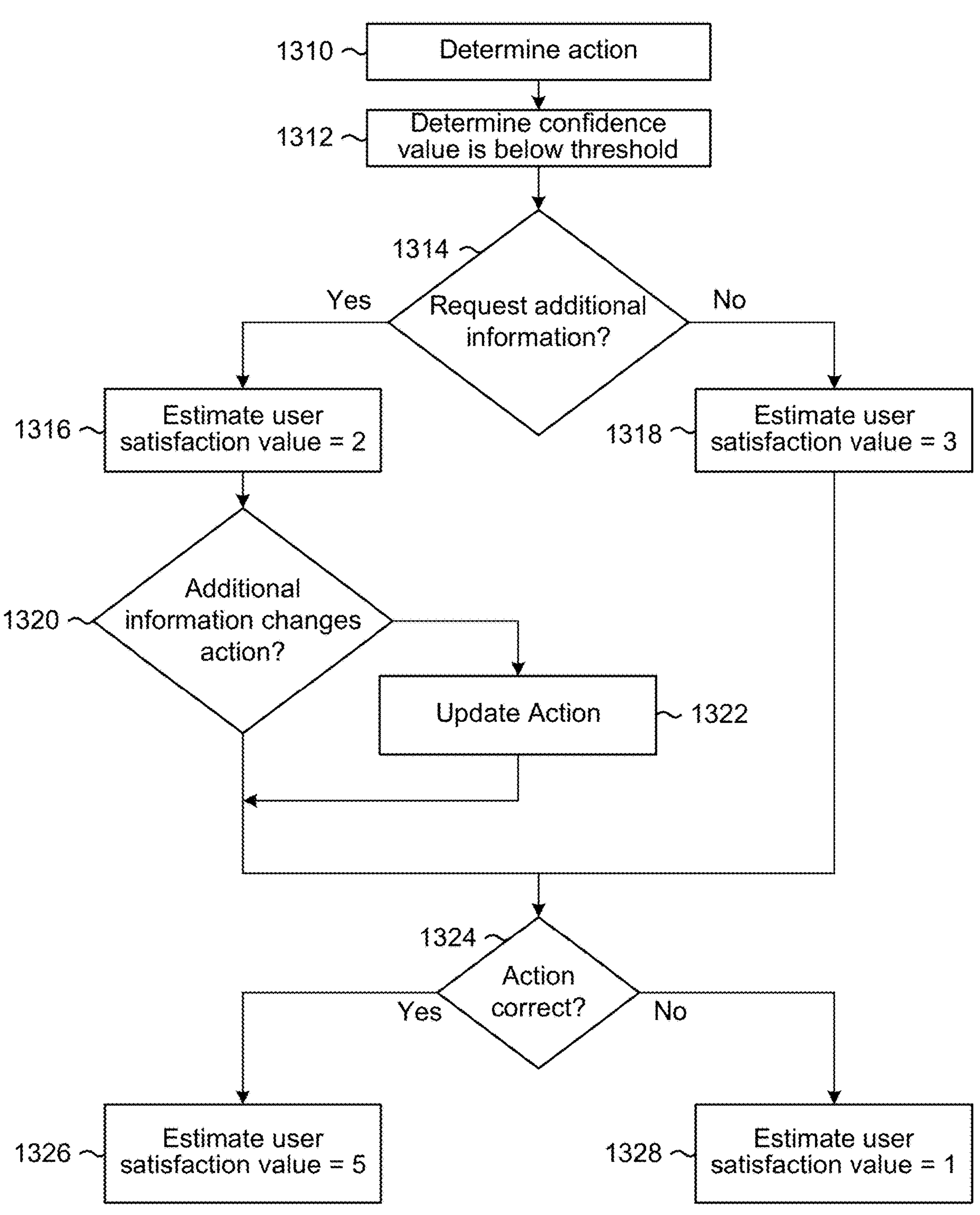
FIG. 13 illustrates an example of optimizing a sum of expected user satisfaction values according to embodiments of the present disclosure.

FIG. 13 illustrates an example of optimizing a sum of expected user satisfaction values according to embodiments of the present disclosure. As illustrated in FIG. 13, the server(s) 120 may determine (1310) an action, determine (1312) that a confidence value associated with the action is below a threshold, and determine (1314) whether to request additional information from the user. If the server(s) 120 requests additional information, the server(s) 120 may estimate (1316) that a user satisfaction corresponds to a value of two, whereas if the server(s) 120 does not request additional information the server(s) 120 may estimate (1318) that the user satisfaction corresponds to a value of three. Thus, if the server(s) 120 were to only compare the user satisfaction values as of requesting the additional information, the server(s) 120 would avoid requesting additional information due to the decrease in user satisfaction.

The server(s) 120 may determine (1320) whether the additional information changes the action determined by the server(s) 120. In some examples, the server(s) 120 may determine that the additional information does change the action and may update (1322) the action accordingly.

At a later point in time, the server(s) 120 may determine (1324) whether the action is correct. For example, when generating output audio to the user the user may provide explicit user feedback that the action is not correct. Additionally or alternatively, the server(s) 120 may infer that the user is correct or incorrect based on data collected by the server(s) 120 without departing from the disclosure. If the action is correct, the server(s) 120 may estimate (1326) that the user satisfaction corresponds to a value of five. If the action is incorrect, the server(s) 120 may estimate (1328) that the user satisfaction corresponds to a value of one. For example, the server(s) 120 may receive a request to "book a flight to Portland" and may purchase a ticket to Portland, Oregon when the user intended to purchase a ticket to Portland, Maine, resulting in the user being very upset.

Instead of comparing the user satisfaction value (e.g., 2) in step 1316 to the user satisfaction value (e.g., 3) in step 1318, the server(s) 120 may instead determine a first expected sum of user satisfaction values corresponding to step 1316 and a second expected sum of satisfaction values corresponding to step 1318. For example, the first expected sum of user satisfaction values may be equal to a value of seven (e.g., 2+5=7), which corresponds to requesting additional information from the user, determining that the additional information changes the action, updating the action and later determining that the action is correct. In contrast, the second expected sum of user satisfaction values may be equal to a value of four (e.g., 3+1=4), which corresponds to not requesting additional information from the user and later determining that the action is incorrect. As the first expected sum is greater than the second expected sum, the server(s) 120 may determine to request the additional information despite this request lowering a user satisfaction.

For ease of illustration, the examples discussed above describe only two out of the four potential outcomes illustrated in FIG. 13 (e.g., (1) requesting additional information and determining that the action is correct, and (2) not requesting additional information and determining that the action is incorrect). In addition, the server(s) 120 could (3) not request additional information but later determine that the action is correct (e.g., expected sum=8), or the server(s) 120 could (4) request additional information and later determine that the action is still incorrect (e.g., expected sum=3).

In some examples, the server(s) 120 may determine the expected sum of user satisfaction values based on a weighted sum of potential outcomes using a confidence value associated with the action. For example, if the confidence value determined in step 1312 is equal to 0.50 (e.g., 50%), the server(s) 120 may determine that the second expected sum of user satisfaction values is equal to a value of six (e.g., 3+5(0.5)+1(0.5)=6), which is determined using the initial user satisfaction value of three from step 1318, a 50% chance of a final user satisfaction value of five (e.g., action is correct) and a 50% chance of a final user satisfaction value of one (e.g., action is incorrect). In contrast, the server(s) 120 may estimate that requesting additional information will increase the confidence value to 0.9 (e.g., 90%) and may determine that the first expected sum of user satisfaction values is equal to a value of 6.6 (e.g., 2+5(0.9)+1(0.1)=6.6), which is determined using the initial user satisfaction value of two from step 1316, a 90% chance of a final user satisfaction value of five (e.g., action is correct) and a 10% chance of a final user satisfaction value of one (e.g., action is incorrect). Thus, the server(s) 120 may determine that the overall benefit of avoiding the incorrect action is worth the decrease in user satisfaction caused by requesting additional information.

FIG. 13 illustrates an example of potential user satisfaction values to explain how the server(s) 120 determines the expected sum of user satisfaction values. However, the disclosure is not limited thereto and the server(s) 120 may determine the expected sum of user satisfaction values using other techniques known to one of skill in the art without departing from the disclosure. In addition, the user satisfaction values illustrated in FIG. 13 may depend on a user. For example, a specific user may really dislike being asked for additional information, dropping the initial user satisfaction value in step 1316 to a value of one. Using the calculation discussed above, the server(s) 120 may determine that the first expected sum is equal to a value of 5.6 (e.g., due to the initial user satisfaction value being equal to one instead of two in step 1316), which is lower than the second expected sum (e.g., 6). Thus, the server(s) 120 may determine not to request additional information despite the confidence value being below the threshold.

The user satisfaction estimator 350 (e.g., the prosody component 840, the sentiment analysis component 845, and/or the satisfaction estimator 850), the core dialog manager 360 (e.g., DNN candidate generator 930, DNN selector 954, etc.), the application 290 (e.g., DNN selector 1154, etc.), and/or other components in the system 100 may implement one or more machine learning models. A ground truth may be established for purposes of training the one or more machine learning models. In machine learning, the term "ground truth" refers to the accuracy of a training set's classification for supervised learning techniques.

As used herein, "history data" may refer to any information regarding previous interactions with the user, device, account or the like. For example, history data may include profile data on a user level (e.g., specific to a user ID), profile data on a device level (e.g., specific to a device ID), profile data on an account level (e.g., specific to an account associated with the user ID and/or the device ID), previous usage history, previous user satisfaction values, additional information stored based on a previous interaction, and/or any combination thereof. Thus, to train the machine learning model, the system 100 may update Various machine learning techniques may be used to train and operate the user satisfaction estimator 350, the core dialog manager 360 and/or the application 290. Such techniques may include backpropagation, statistical learning, supervised learning, semi-supervised learning, stochastic learning, or other known techniques. Such techniques may more specifically include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category. The user response to content output by the system may be used to further train the machine learning model(s).

By training the machine learning models to optimize an expected sum of user satisfaction values, the system 100 may modify how the system 100 generates candidate action(s) and selects from the candidate action(s). For example, the DNN candidate generator 930 and the DNN selector 954 may be trained to improve how the system 100 generates dispatch requests and/or dialog requests, generates and selects candidate action(s), determines a confidence value associated with the selected candidate action, determines the threshold value for determining whether additional information is required, and/or the like. Thus, training the core dialog manager 360 based on user satisfaction values associated with multiple different actions and/or applications improves general functionality of the system 100.

Additionally or alternatively, training the machine learning models included in the application 290 (e.g., DNN selector 1154, etc.) may modify how the system 100 interprets user requests for the individual application 290 once the action has been dispatched to the application 290. For example, the DNN selector 1154 may be trained to improve how the application 290 selects an action in order to optimize user satisfaction. Thus, the machine learning model in the DNN selector 1154 may be trained specifically to improve user satisfaction when selecting actions associated with the specific application 290.

By enabling the dialog action data 345 to be visible to the application 290, as well as by enabling the DNN selector 1154 to be trained to optimize user satisfaction values, the system 100 may improve a functionality of the application 290 even when the application 290 isn't specifically programmed to optimize user satisfaction. Thus, the system 100 extends the machine learning models to the application 290 and enables content owners (e.g., programmers) of the application 290 to optimize user satisfaction values without extensive programming, training or testing. Instead, the content owners can indicate to the server(s) 120 to optimize the machine learning models for user satisfaction values and the server(s) 120 may modify the DNN selector 1154 accordingly.

Figure 15:
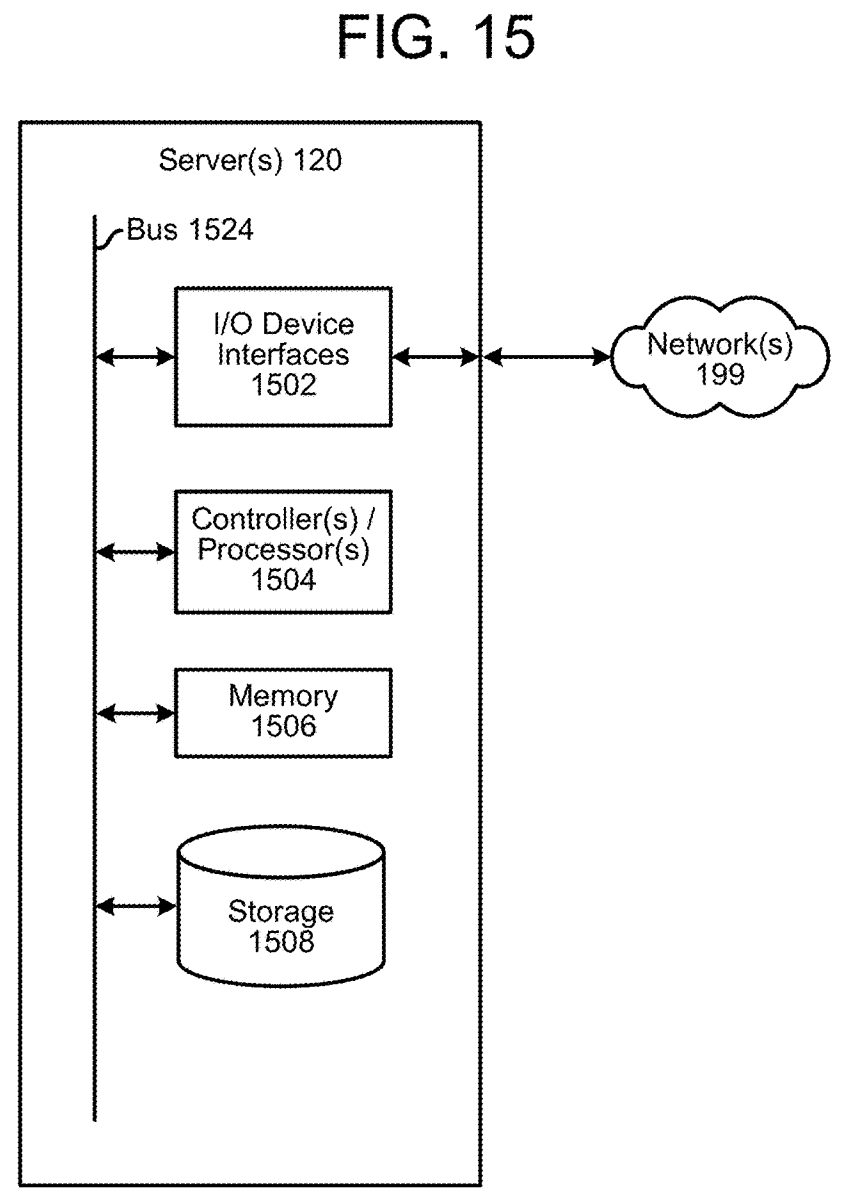

FIG. 14 is a block diagram conceptually illustrating a user device 110 that may be used with the described system. FIG. 15 is a block diagram conceptually illustrating example components of a remote device, such as the server(s) 120 that may assist with speech recognition processing, natural language processing, or command processing. Multiple servers 120 may be included in the system, such as one server 120 for performing speech recognition, one server 120 for performing natural language, etc. In operation, each of these devices (or groups of devices) may include computer-readable and computer-executable instructions that reside on the respective device (110/120), as will be discussed further below.

Each of these devices (110/120) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device (110/120) in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1404, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may further include a display 1422 configured to display content.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1402/1502), processor(s) (1404/1504), memory (1406/1506), and/or storage (1408/1508) of the device(s) 110 and server(s) 120, respectively. Thus, the speech recognition component 250 may have its own I/O interface(s), processor, memory, and/or storage, the natural language component 260 may have its own I/O interface(s), processor, memory, and/or storage, and so forth for the various components discussed herein.

As noted above, multiple devices may be employed in a single system. In such a multi-device system, each of the devices may include different components for performing different aspects of the system's processing. The multiple devices may include overlapping components. The components of the device(s) 110 and the server(s) 120, as illustrated in FIGS. 14 and 15, are exemplary, and may be located as a stand-alone device or may be included, in whole or in part, as a component of a larger device or system.

Figure 16:
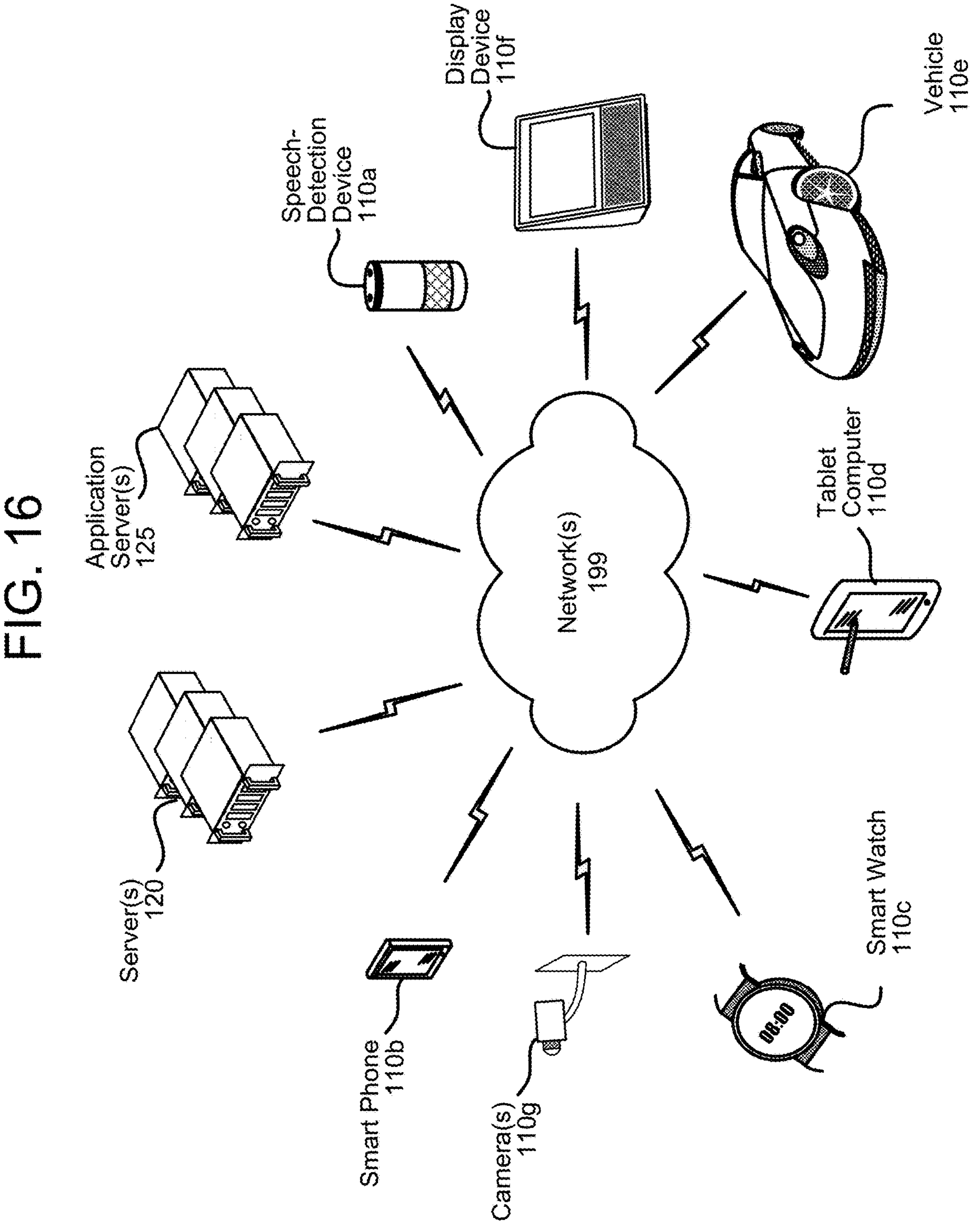
FIG. 16 illustrates an example of a computer network for use with the system.

As illustrated in FIG. 16, multiple devices (110*a*-110*g*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, and/or a camera(s) 110*g* may be connected to the network(s) 199 through a wireless service provider, over a WiFi or cellular network connection, or the like. Other devices are included as network-connected support devices, such as the server(s) 120, the application server(s) 125, or others. The support devices may connect to the network(s) 199 through a wired connection or wireless connection. Networked devices may capture audio using one-or-more built-in or connected microphones or other audio capture devices, with processing performed by speech recognition, natural language, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving first input data corresponding to a first natural language input, the first input data associated with a user profile;

determining history data representing an interaction history associated with the user profile;

determining user satisfaction data associated with a user satisfaction with a dialog corresponding to the interaction history;

generating first dialog state data including the first input data, the history data, and the user satisfaction data;

processing, using a first trained model, the first dialog state data to generate a first request for a first application to generate a response to the first natural language input, wherein the first trained model is trained to use the first dialog state data to determine an application, from a set of applications, to perform processing with respect to the first natural language input;

based on the first request, processing, using a second trained model of the first application, the first dialog state data to generate first content data responsive to the first natural language input, wherein the second trained model is trained to use the first dialog state data to determine an action, from a set of actions associated with the first application, to be performed in response to the first natural language input;

generating first output data corresponding to the first content data; and causing presentation of the first output data.

2. The computer-implemented method of claim 1, further comprising:

storing the first dialog state data and the first content data in association with second dialog state data;

receiving second input data corresponding to a second natural language input;

retrieving the second dialog state data from storage;

processing the second dialog state data using the second trained model to determine second content fourth data responsive to the second natural language input;

determining second output data corresponding to the second content data; and causing presentation of the second output data.

3. The computer-implemented method of claim 1, further comprising:

processing, the first dialog state data using the first trained model to determine a second request for additional information associated with the first natural language input;

determining second output data corresponding to the first request;

causing presentation of the second output data; and receiving second input data corresponding to a second natural language input, wherein processing the first dialog state data using the second trained model to determine the first content data further includes processing the second input data.

4. The computer-implemented method of claim 1, further comprising:

processing, using the first trained model, the first dialog state data to determine a second request for a second application to generate the response to the first natural language input; and based on the first dialog state data, determining to cause execution of the first request, instead of the second request.

5. The computer-implemented method of claim 1, further comprising:

processing, using the first trained model, the first dialog state data to determine a second request for additional information to determine the response to the first natural language input; and based on the first dialog state data, determining to cause execution of the first request, instead of the second request, wherein processing the first dialog state data using the first trained model to determine the first content data is based on determining to cause execution of the first request, instead of the second request.

6. The computer-implemented method of claim 1, further comprising:

determining the history data corresponds to the dialog, the dialog including the first natural language input.

7. The computer-implemented method of claim 1, wherein the first natural language input is received from a first device and wherein the method further comprises:

determining the history data corresponds to the first device.

8. The computer-implemented method of claim 1, wherein the user satisfaction data correspond to an estimated degree of user satisfaction with the dialog.

9. The computer-implemented method of claim 1, further comprising:

after causing presentation of the first output data, receiving second input data corresponding to a second natural language input;

processing, using at least one third trained model, at least the second input data to determine a first value representing an estimated degree of user satisfaction associated with the first output data; and updating at least one of the first trained model and the second trained model based at least in part on the first value.

10. A computing system comprising:

at least one processor; and at least one memory comprising instructions that, when executed by the at least one processor, cause the computing system to:

receive first input data corresponding to a first natural language input, the first input data associated with a user profile;

determine history data representing an interaction history associated with the user profile;

determine user satisfaction data associated with a user satisfaction with a dialog corresponding to the interaction history;

generate first dialog state data including the first input data, the history data, and the user satisfaction data;

process, using a first trained model, the first dialog state data to determine a first request for a first application to generate a response to the first natural language input, wherein the first trained model is trained to determine an application, from a set of applications, to perform processing with respect to the first natural language input;

based on the first request, process, using a second trained model of the first application, the first dialog state data to generate first content data responsive to the first natural language input, wherein the second trained model is trained to use the first dialog state data to determine an action, from a set of actions associated with the first application, to be performed in response to the first natural language input;

determine first output data corresponding to the first content second data; and causing presentation of the first output data.

11. The computing system of claim 10, wherein the at least one memory further comprises instructions that, when executed by the at least one processor, further cause the computing system to:

store the first dialog state data and the first content data in association with second dialog state data;

receive second input data corresponding to a second natural language input;

retrieve the second dialog state data from storage;

process the second dialog state data using the second trained model to determine second content data responsive to the second natural language input;

determine second output data corresponding to the second content data; and cause presentation of the second output data.

12. The computing system of claim 10, wherein the at least one memory further comprises instructions that, when executed by the at least one processor, further cause the computing system to:

process, the first dialog state data using the first trained model to determine a second request for additional information associated with the first natural language input;

determine second output data corresponding to the first request;

cause presentation of the second output data; and receive second input data corresponding to a second natural language input, wherein processing the first dialog state data using the second trained model to determine the first content data further includes processing the second input data.

13. The computing system of claim 10, wherein the at least one memory further comprises instructions that, when executed by the at least one processor, further cause the computing system to:

process, using the first trained model, the first dialog state data to determine a second request for a second application to generate the response to the first natural language input; and based on the first dialog state data, determine to cause execution of the first request, instead of the second request.

14. The computing system of claim 10, wherein the at least one memory further comprises instructions that, when executed by the at least one processor, further cause the computing system to:

process, using the first trained model, the first dialog state data to determine a second request for additional information to determine the response to the first natural language input; and based on the first dialog state data, determine to cause execution of the first request, instead of the second request, wherein processing the first dialog state data using the first trained model to determine the first content data is based on determining to cause execution of the first request, instead of the second request.

15. The computing system of claim 10, wherein the at least one memory further comprises instructions that, when executed by the at least one processor, further cause the computing system to:

determine the history data corresponds to the dialog, the dialog including the first natural language input.

16. The computing system of claim 10, wherein the first natural language input is received from a first device and wherein the at least one memory further comprises instructions that, when executed by the at least one processor, further cause the computing system to:

determine the history data corresponds to the first device.

17. The computing system of claim 10, wherein the user satisfaction data corresponds to an estimated degree of user satisfaction with the dialog.

18. The computing system of claim 10, wherein the at least one memory further comprises instructions that, when executed by the at least one processor, further cause the computing system to:

after causing presentation of the first output data, receive second input data corresponding to a second natural language input;

process, using at least one third trained model, at least the second input data to determine a first value representing an estimated degree of user satisfaction associated with the first output data; and update at least one of the first trained model or the second trained model based at least in part on the first value.

* * * * *